US009189919B2

(12) United States Patent
Caputo et al.

(10) Patent No.: US 9,189,919 B2
(45) **Date of Patent: *Nov. 17, 2015**

(54) GAMING SYSTEM AND METHOD PROVIDING A MULTIPLE-PLAYER BONUS REDEMPTION GAME

(71) Applicant: IGT, Las Vegas, NV (US)

(72) Inventors: Scott A. Caputo, Santa Clara, CA (US); Mark C. Nicely, Daly City, CA (US); Gregory H. Parrott, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/174,462

(22) Filed: Feb. 6, 2014

(65) Prior Publication Data

US 2014/0155143 A1 Jun. 5, 2014

Related U.S. Application Data

(63) Continuation of application No. 11/937,986, filed on Nov. 9, 2007, now Pat. No. 8,651,947.

(51) Int. Cl.
*G06F 17/00* (2006.01)
*G06F 19/00* (2011.01)
*G07F 17/32* (2006.01)

(52) U.S. Cl.
CPC ........ *G07F 17/3244* (2013.01); *G07F 17/3272* (2013.01); *G07F 17/3274* (2013.01); *G07F 17/3262* (2013.01)

(58) Field of Classification Search
None
See application file for complete search history.

(56) References Cited

U.S. PATENT DOCUMENTS 3,167,313 A 1/1965 Davenport et al.
3,281,149 A 10/1966 Miller
4,003,578 A 1/1977 Jones
(Continued)

FOREIGN PATENT DOCUMENTS

DE 2938307 4/1981
EP 0 449 433 10/1991
(Continued)

OTHER PUBLICATIONS

"Slots and Bingo . . . The Best of Both," Brochure published by Casino Data Systems, 1998.
(Continued)

*Primary Examiner* — Steven J Hylinski
(74) *Attorney, Agent, or Firm* — Neal, Gerber & Eisenberg LLP

(57) ABSTRACT

A gaming system and method including a plurality of gaming devices that may participate in a shared secondary or bonus game and a controller operable to communicate with said plurality of gaming devices. At least one of the plurality of gaming devices is programmed to generate and accumulate collectors upon an occurrence of a first triggering event. Upon an occurrence of a second triggering event at one of the gaming devices, the controller enables a player of said gaming device to redeem a quantity of accumulated collectors in a bonus event. The controller also enables the player to invite other gaming devices from the plurality of gaming devices to redeem accumulated collectors and participate in said bonus event. The odds of each player earning a higher-valued total award in the bonus event increases with the total number of accumulated collectors redeemed in the bonus event.

28 Claims, 15 Drawing Sheets

(56) References Cited

U.S. PATENT DOCUMENTS

| | | | |
|---|---|---|---|
| 4,103,895 | A | 8/1978 | Pressman et al. |
| 4,182,515 | A | 1/1980 | Nemeth |
| 4,277,067 | A | 7/1981 | Gettleman |
| 4,323,242 | A | 4/1982 | Rosenfeld |
| 4,339,798 | A | 7/1982 | Hedges et al. |
| 4,511,143 | A | 4/1985 | Sankrithi |
| 4,669,731 | A | 6/1987 | Clarke |
| 4,743,024 | A | 5/1988 | Helm et al. |
| 4,775,155 | A | 10/1988 | Lees |
| 4,805,907 | A | 2/1989 | Hagiwara |
| 4,836,546 | A | 6/1989 | DiRe et al. |
| 4,837,728 | A | 6/1989 | Barrie et al. |
| 4,850,592 | A | 7/1989 | Winter |
| 4,856,787 | A | 8/1989 | Itkis |
| 4,906,005 | A | 3/1990 | Manabe |
| 5,083,271 | A | 1/1992 | Thacher et al. |
| 5,083,800 | A | 1/1992 | Lockton |
| 5,152,529 | A | 10/1992 | Okada |
| 5,178,395 | A | 1/1993 | Lovell |
| 5,186,460 | A | 2/1993 | Fongeallaz et al. |
| 5,205,555 | A | 4/1993 | Hamann |
| 5,242,163 | A | 9/1993 | Fulton |
| 5,259,616 | A | 11/1993 | Bergmann |
| 5,275,400 | A | 1/1994 | Weingardt et al. |
| 5,299,810 | A | 4/1994 | Pierce et al. |
| 5,333,868 | A | 8/1994 | Goldfarb |
| 5,355,442 | A | 10/1994 | Paglieroni et al. |
| 5,393,057 | A | 2/1995 | Marnell, II |
| 5,411,271 | A | 5/1995 | Mirando |
| 5,486,005 | A | 1/1996 | Neal |
| 5,536,016 | A | 7/1996 | Thompson |
| 5,560,603 | A | 10/1996 | Seelig et al. |
| 5,564,700 | A | 10/1996 | Celona |
| 5,564,701 | A | 10/1996 | Dettor |
| 5,566,942 | A | 10/1996 | Elum |
| 5,569,083 | A | 10/1996 | Fioretti |
| 5,580,309 | A | 12/1996 | Piechowiak et al. |
| 5,611,730 | A | 3/1997 | Weiss |
| 5,630,753 | A | 5/1997 | Fuchs |
| 5,639,089 | A | 6/1997 | Matsumoto et al. |
| 5,645,486 | A | 7/1997 | Nagao et al. |
| 5,647,798 | A | 7/1997 | Falciglia |
| 5,655,961 | A | 8/1997 | Acres et al. |
| 5,664,998 | A | 9/1997 | Seelig et al. |
| 5,722,891 | A | 3/1998 | Inoue |
| 5,741,183 | A | 4/1998 | Acres et al. |
| 5,752,882 | A | 5/1998 | Acres et al. |
| 5,758,875 | A | 6/1998 | Giacalone, Jr. |
| 5,761,647 | A | 6/1998 | Boushy |
| 5,769,716 | A | 6/1998 | Saffari et al. |
| 5,772,509 | A | 6/1998 | Weiss |
| 5,779,242 | A | 7/1998 | Kaufmann |
| 5,779,544 | A | 7/1998 | Seelig et al. |
| 5,779,549 | A | 7/1998 | Walker et al. |
| 5,788,573 | A | 8/1998 | Baerlocher et al. |
| 5,813,672 | A | 9/1998 | Loud, Jr. |
| 5,820,459 | A | 10/1998 | Acres et al. |
| 5,823,874 | A | 10/1998 | Adams |
| 5,833,536 | A | 11/1998 | Davids et al. |
| 5,833,537 | A | 11/1998 | Barrie |
| 5,836,817 | A | 11/1998 | Acres et al. |
| 5,836,818 | A | 11/1998 | Jones et al. |
| 5,848,932 | A | 12/1998 | Adams |
| 5,851,148 | A | 12/1998 | Brune et al. |
| D404,436 | S | 1/1999 | McGahn et al. |
| 5,855,514 | A | 1/1999 | Kamille |
| 5,855,515 | A | 1/1999 | Pease et al. |
| 5,876,284 | A | 3/1999 | Acres et al. |
| 5,882,261 | A | 3/1999 | Adams |
| 5,902,983 | A | 5/1999 | Crevelt et al. |
| 5,911,418 | A | 6/1999 | Adams |
| 5,924,927 | A | 7/1999 | Matsuura et al. |
| 5,931,467 | A | 8/1999 | Kamille |
| 5,934,999 | A | 8/1999 | Valdez |
| 5,935,002 | A | 8/1999 | Falciglia |
| 5,947,820 | A | 9/1999 | Morro et al. |
| 5,951,012 | A | 9/1999 | Feola |
| 5,951,397 | A | 9/1999 | Dickinson |
| 5,961,394 | A | 10/1999 | Minabe |
| 5,976,015 | A | 11/1999 | Seelig et al. |
| 5,980,384 | A | 11/1999 | Barrie |
| 5,997,400 | A | 12/1999 | Seelig et al. |
| 5,997,401 | A | 12/1999 | Crawford |
| 6,012,982 | A | 1/2000 | Piechowiak et al. |
| 6,015,346 | A | 1/2000 | Bennett |
| 6,019,369 | A | 2/2000 | Nakagawa et al. |
| 6,033,307 | A | 3/2000 | Vancura |
| 6,039,648 | A | 3/2000 | Guinn et al. |
| 6,050,895 | A | 4/2000 | Luciano, Jr. et al. |
| 6,059,289 | A | 5/2000 | Vancura |
| 6,059,658 | A | 5/2000 | Mangano et al. |
| 6,077,162 | A | 6/2000 | Weiss |
| 6,082,887 | A | 7/2000 | Feuer et al. |
| 6,089,976 | A | 7/2000 | Schneider et al. |
| 6,089,978 | A | 7/2000 | Adams |
| 6,089,980 | A | 7/2000 | Gauselmann |
| 6,102,400 | A | 8/2000 | Scott et al. |
| 6,102,798 | A | 8/2000 | Bennett |
| 6,110,043 | A | 8/2000 | Olsen |
| 6,113,098 | A | 9/2000 | Adams |
| 6,120,377 | A | 9/2000 | McGinnis, Sr. et al. |
| 6,123,335 | A | 9/2000 | Adkins |
| 6,126,542 | A | 10/2000 | Fier |
| 6,134,556 | A | 10/2000 | Shin |
| 6,135,884 | A | 10/2000 | Hedrick et al. |
| 6,135,885 | A | 10/2000 | Lermusiaux |
| 6,142,872 | A | 11/2000 | Walker et al. |
| 6,146,273 | A | 11/2000 | Olsen |
| 6,159,095 | A | 12/2000 | Frohm et al. |
| 6,159,097 | A | 12/2000 | Gura |
| 6,165,071 | A | 12/2000 | Weiss |
| 6,165,072 | A | 12/2000 | Davis et al. |
| 6,168,521 | B1 | 1/2001 | Luciano et al. |
| 6,168,523 | B1 | 1/2001 | Piechowiak et al. |
| 6,186,894 | B1 | 2/2001 | Mayeroff |
| 6,190,255 | B1 | 2/2001 | Thomas et al. |
| 6,203,010 | B1 | 3/2001 | Jorasch et al. |
| 6,203,429 | B1 | 3/2001 | Demar et al. |
| 6,206,782 | B1 | 3/2001 | Walker et al. |
| 6,210,275 | B1 | 4/2001 | Olsen |
| 6,210,277 | B1 | 4/2001 | Stefan |
| 6,213,876 | B1 | 4/2001 | Moore, Jr. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,224,486 | B1 | 5/2001 | Walker et al. |
| 6,231,442 | B1 | 5/2001 | Mayeroff |
| 6,231,445 | B1 | 5/2001 | Acres |
| 6,254,481 | B1 | 7/2001 | Jaffe |
| 6,261,177 | B1 | 7/2001 | Bennett |
| 6,273,420 | B1 | 8/2001 | Brooks |
| 6,287,202 | B1 | 9/2001 | Pascal et al. |
| 6,290,600 | B1 | 9/2001 | Glasson |
| 6,309,299 | B1 | 10/2001 | Weiss |
| 6,309,300 | B1 | 10/2001 | Glavich |
| 6,309,307 | B1 | 10/2001 | Krause et al. |
| 6,312,332 | B1 | 11/2001 | Walker et al. |
| 6,315,660 | B1 | 11/2001 | DeMar et al. |
| 6,315,664 | B1 | 11/2001 | Baerlocher et al. |
| 6,319,124 | B1 | 11/2001 | Baerlocher et al. |
| 6,328,649 | B1 | 12/2001 | Randall et al. |
| 6,338,678 | B1 | 1/2002 | Seelig et al. |
| 6,346,043 | B1 | 2/2002 | Colin et al. |
| 6,347,996 | B1 | 2/2002 | Gilmore et al. |
| 6,364,767 | B1 | 4/2002 | Brossard et al. |
| 6,398,644 | B1 | 6/2002 | Perrie et al. |
| 6,406,369 | B1 | 6/2002 | Baerlocher et al. |
| 6,425,824 | B1 | 7/2002 | Baerlocher et al. |
| 6,439,995 | B1 | 8/2002 | Hughs-Baird et al. |
| 6,443,837 | B1 | 9/2002 | Jaffe et al. |
| 6,450,883 | B1 | 9/2002 | O'Halloran |
| 6,461,241 | B1 | 10/2002 | Webb et al. |
| 6,494,785 | B1 | 12/2002 | Gerrard et al. |
| 6,508,709 | B1 | 1/2003 | Karmarkar |

(56) References Cited

U.S. PATENT DOCUMENTS

| | | | |
|---|---|---|---|
| 6,511,375 | B1 | 1/2003 | Kaminkow |
| 6,514,141 | B1 | 2/2003 | Kaminkow et al. |
| 6,533,273 | B2 | 3/2003 | Cole et al. |
| 6,558,254 | B2 | 5/2003 | Baelocher et al. |
| 6,572,469 | B2 | 6/2003 | Klitsner et al. |
| 6,572,473 | B1 | 6/2003 | Baerlocher |
| 6,582,307 | B2 | 6/2003 | Webb |
| 6,589,117 | B1 | 7/2003 | Moritome et al. |
| 6,595,854 | B2 | 7/2003 | Hughs-Baird et al. |
| 6,599,185 | B1 | 7/2003 | Kaminkow et al. |
| 6,602,136 | B1 | 8/2003 | Baerlocher et al. |
| 6,602,137 | B2 | 8/2003 | Kaminkow et al. |
| 6,607,438 | B2 | 8/2003 | Baerlocher et al. |
| 6,612,574 | B1 | 9/2003 | Cole et al. |
| 6,612,575 | B1 | 9/2003 | Cole et al. |
| 6,632,141 | B2 | 10/2003 | Webb et al. |
| 6,638,164 | B2 | 10/2003 | Randall et al. |
| 6,644,664 | B2 | 11/2003 | Muir et al. |
| 6,645,071 | B2 | 11/2003 | Perrie et al. |
| 6,652,378 | B2 | 11/2003 | Cannon et al. |
| 6,656,040 | B1 | 12/2003 | Brosnan et al. |
| 6,676,516 | B2 | 1/2004 | Baerlocher et al. |
| 6,676,521 | B1 | 1/2004 | La Mura et al. |
| 6,688,975 | B2 | 2/2004 | Baerlocher et al. |
| 6,688,977 | B1 | 2/2004 | Baerlocher et al. |
| 6,692,356 | B2 | 2/2004 | Baerlocher et al. |
| 6,722,976 | B2 | 4/2004 | Adams |
| 6,722,981 | B2 | 4/2004 | Kaminkow et al. |
| 6,722,982 | B2 | 4/2004 | Kaminkow et al. |
| 6,722,983 | B2 | 4/2004 | Kaminkow et al. |
| 6,726,565 | B2 | 4/2004 | Hughs-Baird |
| 6,733,386 | B2 | 5/2004 | Cuddy et al. |
| 6,743,096 | B2 | 6/2004 | Allendorf et al. |
| 6,749,504 | B2 | 6/2004 | Hughs-Baird |
| 6,758,747 | B2 | 7/2004 | Baerlocher |
| 6,769,983 | B2 | 8/2004 | Slomiany |
| 6,780,107 | B2 | 8/2004 | Baerlocher et al. |
| 6,780,110 | B2 | 8/2004 | Baerlocher et al. |
| 6,783,457 | B2 | 8/2004 | Hughs-Baird et al. |
| 6,796,899 | B2 | 9/2004 | Baerlocher |
| 6,800,026 | B2 | 10/2004 | Cannon |
| 6,814,664 | B2 | 11/2004 | Baerlocher et al. |
| 6,817,944 | B2 | 11/2004 | Kaminkow et al. |
| 6,837,793 | B2 | 1/2005 | McClintic |
| 6,840,856 | B2 | 1/2005 | Stern |
| 6,843,722 | B2 | 1/2005 | Webb |
| 6,863,606 | B1 | 3/2005 | Berg et al. |
| 6,866,584 | B2 | 3/2005 | Michaelson |
| 6,875,108 | B1 | 4/2005 | Hughs-Baird |
| 6,880,168 | B2 | 4/2005 | Maehiro |
| 6,887,154 | B1 | 5/2005 | Luciano, Jr. et al. |
| 6,890,255 | B2 | 5/2005 | Jarvis et al. |
| 6,899,620 | B2 | 5/2005 | Kaminkow et al. |
| 6,902,478 | B2 | 6/2005 | McClintic |
| 6,905,406 | B2 | 6/2005 | Kaminkow et al. |
| 6,913,533 | B2 | 7/2005 | Cuddy et al. |
| 6,918,830 | B2 | 7/2005 | Baerlocher |
| 6,932,701 | B2 | 8/2005 | Glavich et al. |
| 6,939,224 | B2 | 9/2005 | Palmer et al. |
| 6,958,013 | B2 | 10/2005 | Miereau et al. |
| 6,966,833 | B2 | 11/2005 | Kaminkow et al. |
| 6,966,834 | B1 | 11/2005 | Johnson |
| 6,971,954 | B2 | 12/2005 | Randall et al. |
| 6,988,946 | B2 | 1/2006 | Michaelson et al. |
| 6,988,948 | B2 | 1/2006 | Perrie et al. |
| 6,995,751 | B2 | 2/2006 | Falvo |
| 6,996,833 | B1 | 2/2006 | Olson et al. |
| 7,011,581 | B2 | 3/2006 | Cole et al. |
| 7,029,395 | B1 | 4/2006 | Baerlocher |
| 7,037,191 | B2 | 5/2006 | Rodgers et al. |
| 7,037,192 | B2 | 5/2006 | Baerlocher et al. |
| 7,040,984 | B2 | 5/2006 | Mead |
| 7,056,214 | B2 | 6/2006 | Miereau et al. |
| 7,077,744 | B2 | 7/2006 | Cannon |
| 7,081,050 | B2 | 7/2006 | Tarantino |
| 7,104,888 | B2 | 9/2006 | Miereau et al. |
| 7,112,137 | B2 | 9/2006 | Baerlocher et al. |
| 7,121,942 | B2 | 10/2006 | Baerlocher |
| 7,158,798 | B2 | 1/2007 | Lee et al. |
| 7,160,186 | B2 | 1/2007 | Cuddy et al. |
| 7,160,188 | B2 | 1/2007 | Kaminkow et al. |
| 7,169,041 | B2 | 1/2007 | Tessmer et al. |
| 7,169,042 | B2 | 1/2007 | Muir et al. |
| 7,169,044 | B2 | 1/2007 | Baerlocher et al. |
| 7,172,506 | B2 | 2/2007 | Baerlocher et al. |
| 7,175,523 | B2 | 2/2007 | Gilmore et al. |
| 7,182,689 | B2 | 2/2007 | Hughs-Baird et al. |
| 7,192,348 | B2 | 3/2007 | Brosnan |
| 7,198,570 | B2 | 4/2007 | Rodgers et al. |
| 7,201,657 | B2 | 4/2007 | Baerlocher et al. |
| 7,223,172 | B2 | 5/2007 | Baerlocher et al. |
| 7,235,011 | B2 | 6/2007 | Randall et al. |
| 7,240,093 | B1 | 7/2007 | Danieli et al. |
| 7,257,714 | B1 | 8/2007 | Shen |
| 7,264,545 | B2 | 9/2007 | Maya et al. |
| 7,291,069 | B2 | 11/2007 | Michaelson et al. |
| 7,300,348 | B2 | 11/2007 | Kaminkow et al. |
| 7,303,469 | B2 | 12/2007 | Kaminkow |
| 7,311,598 | B2 | 12/2007 | Kaminkow et al. |
| 7,311,604 | B2 | 12/2007 | Kaminkow et al. |
| 7,311,608 | B1 | 12/2007 | Danieli et al. |
| 7,314,408 | B2 | 1/2008 | Cannon |
| 7,314,409 | B2 | 1/2008 | Maya et al. |
| 7,314,410 | B2 | 1/2008 | Baerlocher et al. |
| 7,318,773 | B2 | 1/2008 | Baerlocher |
| 7,326,115 | B2 | 2/2008 | Baerlocher |
| 7,338,367 | B2 | 3/2008 | Kaminkow et al. |
| 7,338,369 | B2 | 3/2008 | Mierau et al. |
| 7,351,140 | B2 | 4/2008 | Wolf et al. |
| 7,361,087 | B2 | 4/2008 | Baerlocher et al. |
| 7,387,571 | B2 | 6/2008 | Walker et al. |
| 7,393,280 | B2 | 7/2008 | Cannon |
| 7,422,213 | B2 | 9/2008 | Katz et al. |
| 7,427,236 | B2 | 9/2008 | Kaminkow et al. |
| 7,448,949 | B2 | 11/2008 | Kaminkow et al. |
| 2001/0016513 | A1 | 8/2001 | Muir et al. |
| 2002/0016200 | A1 | 2/2002 | Baerlocher et al. |
| 2002/0039923 | A1 | 4/2002 | Cannon et al. |
| 2002/0042296 | A1 | 4/2002 | Walker et al. |
| 2002/0052232 | A1 | 5/2002 | Kaminkow |
| 2002/0128055 | A1 | 9/2002 | Adams |
| 2002/0177483 | A1 | 11/2002 | Cannon |
| 2003/0013514 | A1 | 1/2003 | Cregan et al. |
| 2003/0036422 | A1 | 2/2003 | Baerlocher et al. |
| 2003/0036424 | A1 | 2/2003 | Baerlocher |
| 2003/0040358 | A1 | 2/2003 | Rothkranz et al. |
| 2003/0060264 | A1 | 3/2003 | Chilton et al. |
| 2003/0064773 | A1 | 4/2003 | Baerlocher et al. |
| 2003/0064807 | A1 | 4/2003 | Walker et al. |
| 2003/0078091 | A1 | 4/2003 | Brandstetter et al. |
| 2003/0078096 | A1 | 4/2003 | Kaminkow et al. |
| 2003/0104853 | A1 | 6/2003 | Tessmer et al. |
| 2003/0114220 | A1 | 6/2003 | McClintic |
| 2003/0119581 | A1 | 6/2003 | Cannon et al. |
| 2003/0125107 | A1 | 7/2003 | Cannon |
| 2003/0127793 | A1 | 7/2003 | Adams |
| 2003/0153378 | A1 | 8/2003 | Schlegel et al. |
| 2003/0157982 | A1 | 8/2003 | Gerrard et al. |
| 2003/0162578 | A1 | 8/2003 | Baerlocher et al. |
| 2004/0048644 | A1 | 3/2004 | Gerrard et al. |
| 2004/0048649 | A1 | 3/2004 | Peterson et al. |
| 2004/0053665 | A1 | 3/2004 | Baerlocher |
| 2004/0082373 | A1 | 4/2004 | Cole et al. |
| 2004/0111358 | A1 | 6/2004 | Lange et al. |
| 2004/0152520 | A1 | 8/2004 | Shinoda |
| 2004/0166923 | A1 | 8/2004 | Michaelson et al. |
| 2004/0224770 | A1 | 11/2004 | Wolf et al. |
| 2004/0229671 | A1 | 11/2004 | Stronach et al. |
| 2004/0242315 | A1 | 12/2004 | Paulsen et al. |
| 2004/0248639 | A1 | 12/2004 | Slomiany |
| 2005/0020340 | A1 | 1/2005 | Cannon |
| 2005/0020351 | A1 | 1/2005 | Baerlocher et al. |
| 2005/0020352 | A1 | 1/2005 | Chilton et al. |
| 2005/0026687 | A1 | 2/2005 | Watanabe |

(56) References Cited

U.S. PATENT DOCUMENTS

| | | | | |
|---|---|---|---|---|
| 2005/0033461 | A1 | 2/2005 | Gerrard et al. | |
| 2005/0054404 | A1 | 3/2005 | Baerlocher | |
| 2005/0054405 | A1 | 3/2005 | Baerlocher et al. | |
| 2005/0054415 | A1 | 3/2005 | Kaminkow et al. | |
| 2005/0054416 | A1 | 3/2005 | Hostetler et al. | |
| 2005/0054435 | A1 | 3/2005 | Rodgers et al. | |
| 2005/0059456 | A1 | 3/2005 | Mead et al. | |
| 2005/0059461 | A1 | 3/2005 | Ching et al. | |
| 2005/0064928 | A1 | 3/2005 | Baerlocher et al. | |
| 2005/0096123 | A1 | 5/2005 | Cregan et al. | |
| 2005/0101372 | A1 | 5/2005 | Mierau et al. | |
| 2005/0137014 | A1 | 6/2005 | Vetelainen | |
| 2005/0181860 | A1 | 8/2005 | Nguyen et al. | |
| 2005/0192081 | A1 | 9/2005 | Marks et al. | |
| 2005/0197180 | A1 | 9/2005 | Kaminkow et al. | |
| 2005/0202875 | A1 | 9/2005 | Murphy et al. | |
| 2005/0218591 | A1 | 10/2005 | Torigian et al. | |
| 2005/0227754 | A1 | 10/2005 | Kaminkow et al. | |
| 2006/0025195 | A1 | 2/2006 | Pennington et al. | |
| 2006/0025201 | A1* | 2/2006 | Van Asdale | 463/20 |
| 2006/0030401 | A1 | 2/2006 | Mead et al. | |
| 2006/0030959 | A1 | 2/2006 | Duhamel | |
| 2006/0035696 | A1 | 2/2006 | Walker et al. | |
| 2006/0040732 | A1 | 2/2006 | Baerlocher et al. | |
| 2006/0046821 | A1 | 3/2006 | Kaminkow et al. | |
| 2006/0046822 | A1 | 3/2006 | Kaminkow et al. | |
| 2006/0068882 | A1 | 3/2006 | Baerlocher et al. | |
| 2006/0068893 | A1 | 3/2006 | Jaffe et al. | |
| 2006/0073874 | A1 | 4/2006 | Cregan et al. | |
| 2006/0079317 | A1 | 4/2006 | Flemming et al. | |
| 2006/0084500 | A1 | 4/2006 | Baerlocher et al. | |
| 2006/0089194 | A1 | 4/2006 | Joshi et al. | |
| 2006/0121971 | A1 | 6/2006 | Slomiany et al. | |
| 2006/0157934 | A1 | 7/2006 | Yoseloff et al. | |
| 2006/0183528 | A1 | 8/2006 | Rodgers et al. | |
| 2006/0199628 | A1 | 9/2006 | Rodgers et al. | |
| 2006/0217170 | A1 | 9/2006 | Roireau | |
| 2006/0246977 | A1 | 11/2006 | Cannon | |
| 2006/0247011 | A1 | 11/2006 | Gagner | |
| 2006/0287057 | A1 | 12/2006 | Osawa | |
| 2007/0015566 | A1 | 1/2007 | Baerlocher et al. | |
| 2007/0015585 | A1 | 1/2007 | Sartini | |
| 2007/0032285 | A1 | 2/2007 | Wolf | |
| 2007/0054732 | A1 | 3/2007 | Baerlocher | |
| 2007/0054733 | A1 | 3/2007 | Baerlocher | |
| 2007/0060271 | A1 | 3/2007 | Cregan et al. | |
| 2007/0060300 | A1 | 3/2007 | Baerlocher | |
| 2007/0060369 | A1* | 3/2007 | Martin | 463/42 |
| 2007/0077990 | A1 | 4/2007 | Cuddy et al. | |
| 2007/0077997 | A1 | 4/2007 | Johnson | |
| 2007/0087809 | A1 | 4/2007 | Baerlocher | |
| 2007/0105620 | A1 | 5/2007 | Cuddy et al. | |
| 2007/0111783 | A1 | 5/2007 | Cuddy et al. | |
| 2007/0117606 | A1 | 5/2007 | Baerlocher et al. | |
| 2007/0117608 | A1 | 5/2007 | Roper et al. | |
| 2007/0123353 | A1 | 5/2007 | Smith | |
| 2007/0129131 | A1 | 6/2007 | Kaminkow et al. | |
| 2007/0149269 | A1 | 6/2007 | Benbrahim | |
| 2007/0155485 | A1 | 7/2007 | Cuddy et al. | |
| 2007/0167211 | A1 | 7/2007 | Rodgers et al. | |
| 2007/0167217 | A1 | 7/2007 | Kaminkow et al. | |
| 2007/0173325 | A1 | 7/2007 | Shaw et al. | |
| 2007/0184896 | A1 | 8/2007 | Dickerson | |
| 2007/0218997 | A1 | 9/2007 | Cho | |
| 2007/0243936 | A1 | 10/2007 | Binenstock et al. | |
| 2007/0265060 | A1 | 11/2007 | Hornik et al. | |
| 2007/0281775 | A1* | 12/2007 | Kashima | 463/20 |
| 2007/0298858 | A1 | 12/2007 | Toneguzzo | |
| 2007/0298874 | A1 | 12/2007 | Baerlocher et al. | |
| 2007/0298875 | A1 | 12/2007 | Baerlocher et al. | |
| 2008/0004102 | A1 | 1/2008 | Kojima | |
| 2008/0020822 | A1 | 1/2008 | Cuddy et al. | |
| 2008/0020846 | A1 | 1/2008 | Vasquez | |
| 2008/0064502 | A1 | 3/2008 | Schlottmann et al. | |
| 2008/0076514 | A1 | 3/2008 | Baerlocher et al. | |
| 2008/0076515 | A1 | 3/2008 | Baerlocher et al. | |
| 2008/0076517 | A1 | 3/2008 | Baerlocher et al. | |
| 2008/0076552 | A1 | 3/2008 | Baerlocher et al. | |
| 2008/0108404 | A1 | 5/2008 | Iddings et al. | |
| 2008/0108429 | A1 | 5/2008 | Davis et al. | |
| 2008/0113735 | A1 | 5/2008 | Maya | |
| 2008/0146322 | A1 | 6/2008 | Hardy et al. | |
| 2008/0146323 | A1 | 6/2008 | Hardy et al. | |
| 2008/0146345 | A1 | 6/2008 | Hardy et al. | |
| 2008/0176650 | A1 | 7/2008 | Wolf et al. | |
| 2008/0182662 | A1 | 7/2008 | Yoshizawa | |
| 2008/0214310 | A1 | 9/2008 | Brunet De Courssou et al. | |
| 2008/0227549 | A1 | 9/2008 | Itskov et al. | |
| 2008/0227552 | A1 | 9/2008 | Shimomura et al. | |
| 2008/0280670 | A1 | 11/2008 | Sakuma | |
| 2013/0210511 | A1 | 8/2013 | LaRocca et al. | |

FOREIGN PATENT DOCUMENTS

| | | |
|---|---|---|
| EP | 0 464 935 | 1/1992 |
| EP | 0 945 837 | 9/1999 |
| EP | 1 063 622 | 12/2000 |
| EP | 1 199 689 | 4/2002 |
| EP | 1 298 607 | 4/2003 |
| EP | 1 531 434 | 5/2005 |
| EP | 1 764 753 | 3/2007 |
| EP | 1 779 908 | 5/2007 |
| GB | 2066991 | 7/1981 |
| GB | 2072395 | 9/1981 |
| GB | 2084371 | 4/1982 |
| GB | 2096376 | 10/1982 |
| GB | 2137392 | 10/1984 |
| GB | 2161008 | 1/1986 |
| GB | 2170938 | 8/1986 |
| GB | 2182186 | 5/1987 |
| GB | 2191030 | 12/1987 |
| GB | 2201821 | 9/1988 |
| GB | 2202984 | 10/1988 |
| GB | 2226436 | 6/1990 |
| GB | 2242300 | 9/1991 |
| JP | 5131044 | 5/1993 |
| WO | WO 98/00210 | 1/1998 |
| WO | WO 00/12186 | 3/2000 |
| WO | WO 00/20082 | 4/2000 |
| WO | WO 00/43087 | 7/2000 |
| WO | WO 02/096528 | 12/2002 |
| WO | WO 03/010725 | 2/2003 |
| WO | WO 03/026757 | 4/2003 |
| WO | WO 03/083796 | 10/2003 |
| WO | WO 2005/110570 | 11/2005 |
| WO | WO 2006/063054 | 6/2006 |
| WO | WO 2007/011502 | 1/2007 |
| WO | WO 2007/030641 | 3/2007 |
| WO | WO 2007/030733 | 3/2007 |
| WO | WO 2007/030801 | 3/2007 |
| WO | WO 2007/087078 | 8/2007 |
| WO | WO 2008/022323 | 2/2008 |
| WO | WO 2008/027062 | 3/2008 |
| WO | WO 2008/109987 | 9/2008 |

OTHER PUBLICATIONS

Bueschel, Richard M., “Slots 1,” Entries about Mills Futurity Bell Machine and Mills Bonus Bell Machine, 1978, pp. 136, 142.

Cosmic Encounter—Science Fiction Themed Strategy Board Game—entry, http://en.wikipedia.org/wiki/Cosmic_encounter (retrieved Jan. 5, 2009).

Cosmic Encounter by Avalon—Science Fiction Themed Strategy Board Game—Board Game Rules (2000).

Fey, Marshall, “Slot Machines,” Mills Bonus Bell and Discount Wheels Entries, 1983, p. 126, 150.

IGT Gaming System Brochure, IGT (Available by Oct. 2006).

Legato, Frank, “Instant Slotto,” Strictly Slots (Apr. 2001).

Intergame Magazine, Jun. 1995, cover and pp. 91, 101.

Jackpot Bingo published by CDS.com printed on Apr. 12, 2001.

(56) References Cited

OTHER PUBLICATIONS

Jewel in the Crown Brochure published by IGT in 1999.
Match Reel Game Bonus Description published by IGT, available by to Oct. 2006.
Raining Diamonds Advertisement, Sierra Design Group (2001).
Scarne, John, Scarne's New Complete Guide to Gambling, Simon & Schuster, pp. 162-167 (1974).
Silver Strike Advertisement and Pictures, Anchor Gaming (1997).

* cited by examiner

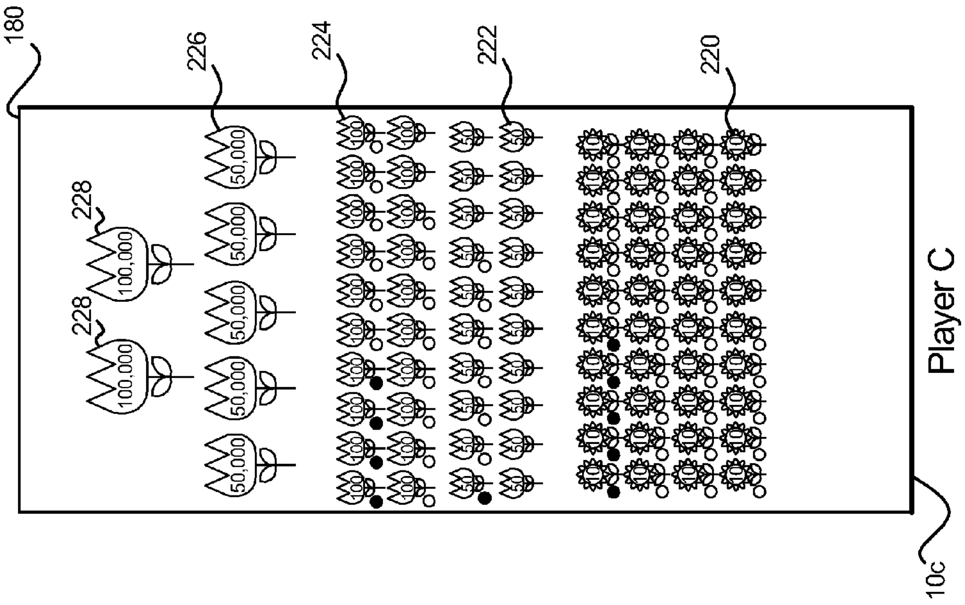
FIG. 4I
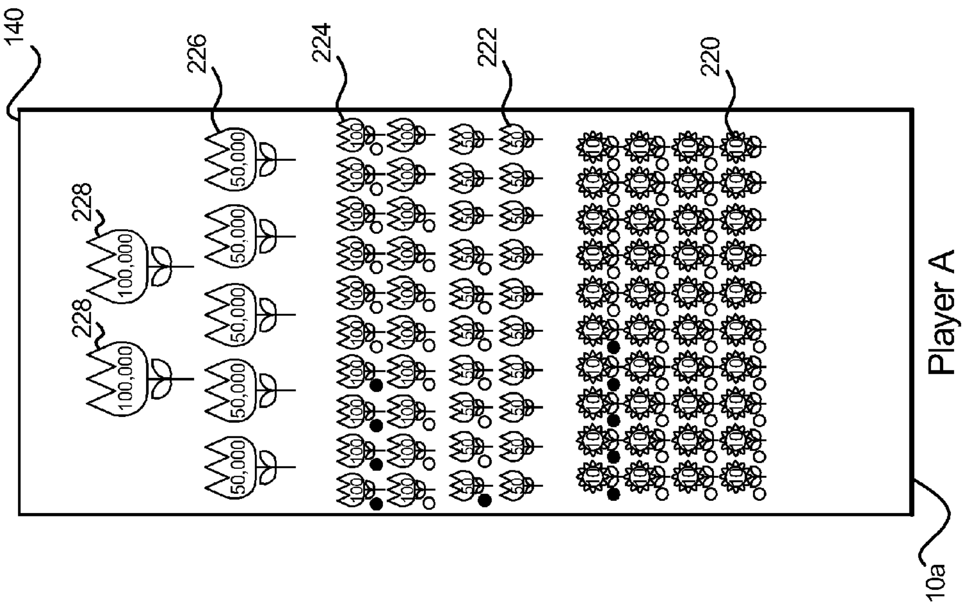

GAMING SYSTEM AND METHOD PROVIDING A MULTIPLE-PLAYER BONUS REDEMPTION GAME

PRIORITY CLAIM

This application is a continuation of, claims priority to and the benefit of U.S. patent application Ser. No. 11/937,986, filed on Nov. 9, 2007, the entire contents of which is incorporated by reference herein.

COPYRIGHT NOTICE

A portion of the disclosure of this patent document contains material which is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award). Generally, symbols or symbol combinations which are less likely to occur usually provide higher awards. In such known gaming machines, the amount of the wager made on the base game by the player may vary.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machine generally indicates this to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be). In other words, obtaining a bonus event and a bonus award in the bonus event is part of the enjoyment and excitement for players.

Certain secondary or bonus games are activated automatically. Other secondary or bonus games require player activation. Once activated, certain secondary or bonus games play to the end or final bonus award automatically. Other secondary or bonus games require at least some level of player interaction which may vary. In certain secondary or bonus games, the player needs to pick selections in order to obtain an award. In certain secondary or bonus games, the player is required to make one or more decisions, such as whether to risk one amount for a higher amount. From the triggering of these secondary or bonus games to the end of these secondary or bonus games, the player is generally provided indications, instructions and information about the play of these secondary or bonus games. These indications, instructions and information typically inform the player of how and why the player is obtaining or has won any awards in the secondary or bonus game. Gaming machines often include a display device to display how and why the player is obtaining the secondary or bonus award.

In certain gaming systems with community games, a portion of each player's coin-in is contributed to one or more local area jackpots, one or more of which can be won during the next bonus event. Typically, these bonus events are triggered randomly for the entire bank of players and all players who have played a certain amount since the last bonus are able to participate in this bonus event. Once in the bonus event, typically the player who contributed the most to the jackpot has the best odds of winning it. Such a gaming system thus makes community gaming less interesting for low-roller players who often lose out to high-roller players.

There is a continuing need to provide new and different gaming machines and gaming systems as well as new and different ways to provide awards to players including bonus awards. There is also a continuing need to provide new and different linked or related gaming machines. There is also a continuing need to provide community bonus games in which players can act together to jointly obtain higher bonus awards than they might obtain acting alone.

SUMMARY

The present disclosure generally relates to gaming systems and methods which provide a multiple-player bonus redemption game, and more particularly a gaming system and method providing a plurality of gaming devices which are in communication with or linked by a controller configured to operate a multiple-player bonus or secondary game. In one embodiment, the plurality of gaming devices generate and accumulate collectors upon occurrences of first triggering or accumulation events. In one form, such collectors represent future bonus redemption opportunities. The collectors may be represented by any suitable symbols or indicia and may be used or redeemed to obtain awards in a bonus event as described herein. In one embodiment, upon an occurrence of a second triggering or redemption event at or for one of the plurality of gaming devices, the gaming device provides a designated player of that gaming device the option to redeem a quantity of accumulated collectors in a bonus or secondary event. The gaming device also enables that player to invite at least one other player of one of the gaming devices in the gaming system to participate in the bonus or secondary event. In this embodiment, the controller determines which gaming devices will participate in the bonus event and provides the bonus event accordingly. In the bonus event, the gaming system determines any awards associated with the redemption of accumulated collectors for the designated player and for any of the other players participating in the bonus event.

More specifically, in one embodiment, each of the gaming devices includes a base or primary game operable upon a wager by a player and a display device operable to display the base or primary game. For each gaming device, when a first triggering or accumulation event occurs at or for that gaming device, the gaming device generates a designated quantity of collectors and accumulates the generated collectors. Upon each subsequent occurrence of said first triggering or accumulation event, the gaming device generates and accumulates one or more additional collectors. In different embodiments, the determination of if any collectors are accumulated and/or the determination of a quantity of collectors to provide to a player for each accumulation event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. It should be appreciated that the collectors can be generated and accumulated in any other suitable manner by the gaming devices or the controller.

In one embodiment, upon a suitable second triggering or redemption event at or for one of the gaming devices in the gaming system, a bonus event occurs. When the bonus event occurs, the gaming device at which the second triggering or redemption event occurred enables a player of that gaming device to participate in the bonus event to redeem some or all of the collectors accumulated on or associated with the gaming device. In one such embodiment, if the player chooses to redeem some or all of the accumulated collectors, the gaming device provides the further option to invite players of other gaming devices in the gaming system to participate in the bonus event.

In one embodiment, if the player declines to invite players of other gaming devices to participate in the bonus event, the controller provides the bonus event using the collectors associated with the gaming device at or for which the second triggering event occurred. In one embodiment, the controller determines any awards associated with each collector in the bonus event and communicates those awards to the gaming device. The gaming device provides the player a total award in or for the bonus event. The total award, in one embodiment, is equal to the sum of awards associated with each collector.

In one embodiment, the designated player specifies the number of additional collectors that the designated player wants to join for the triggered bonus event. In this embodiment, once this number of additional collectors have been committed by other players, no more other players can join the bonus event. In one such embodiment, no more than the requested number of additional collectors may join a designated player's bonus event. In another such embodiment, when a secondary player accepts the invitation and joins the bonus event with a number of collectors specified by that secondary player, all of the secondary player's accumulated collectors join the bonus event even if this number exceeds the designated player's collector request amount. In another embodiment, if secondary players did not commit all of the collectors requested by the designated player, then one or more virtual collectors are added to the bonus event. In this embodiment, any awards collected by a virtual collector does not go to any player. In another embodiment, if there are no or too few other players join the triggered bonus event (such as there are no or too few other players playing at a given time), one or more virtual secondary players with virtual collectors are available for a designated player to invite to join the bonus event. In another embodiment with virtual players, these virtual players may invite live players to redeem a bonus redemption triggered by the virtual player.

In one embodiment, if the player chooses to invite players of other gaming devices to participate in the bonus event, the gaming device provides a list or display of other gaming devices (or players thereof) from the plurality of gaming devices and enables the player to select which gaming devices (or players thereof) to invite to participate in the bonus event. In a further embodiment, if the player chooses to invite players of other gaming devices to participate in the bonus event, the gaming device provides a list or display of other gaming devices and the number of collectors accumulated on or associated with each such gaming device. In one such embodiment, the gaming device enables the player to select which gaming devices to invite to participate in the bonus event at least in part based on the number of accumulated collectors respectively associated with the other gaming devices. In different embodiments, the other players of other gaming devices which a player may select to invite to participate in the bonus event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. In another embodiment, the gaming system provides that a designated quantity of other players can participate in and/or be invited to participate in a triggered bonus event.

In one embodiment, the gaming device enables the player to invite players of other gaming devices simultaneously. In another embodiment, the gaming device enables the player to invite players of other gaming devices sequentially. In one such embodiment, the gaming device enables the player to invite one player of one of the other gaming devices to redeem collectors in the bonus event. The player may continue to invite players of other gaming devices until the desired number of accumulated collectors are participating in the bonus event. In another embodiment, if the player chooses to invite players of other gaming devices to participate in the bonus event, the controller selects which other gaming devices from among the plurality of gaming devices to invite to participate in the bonus event.

In one embodiment, the other gaming devices invited to participate in the bonus event provide the players of such other gaming devices the option of participating in the bonus event. In another embodiment, each gaming device invited to participate in the bonus event provides a list or display of (i) the other invited gaming devices and the gaming device at which the second triggering event occurred, and (ii) the number of collectors accumulated on or associated with each such gaming device. In various embodiments, the players of the other gaming devices invited to participate in the bonus event have a time limit within which to accept the invitation to participate in the bonus event. In certain embodiments, the other gaming devices invited to participate in the bonus event display or indicate the time limit to the players of such other gaming devices.

In one embodiment, after determining which gaming devices will participate in the bonus event, the controller causes each gaming device participating in the bonus event to display an indication of the other gaming devices that will participate in the bonus event. In one embodiment, each participating gaming device will also display the quantity of accumulated collectors associated with each of the other participating gaming devices.

In one embodiment, the participating gaming devices provide the players of such gaming devices the option to cancel the bonus event. For example, the player may cancel the bonus event if the total quantity of accumulated collectors from among the other participating gaming devices is small or if not enough other players participate in the bonus event.

After determining which gaming devices (or players thereof) will participate in the bonus event, the controller provides the bonus event. In one embodiment, the controller determines an award, such as a bonus event value, for each gaming device participating in the bonus event. In one embodiment, the controller determines any awards associated with each accumulated collector in the bonus event and communicates said awards to each participating gaming device, wherein each collector is associated with a participating gaming device. Each participating gaming device provides a total award in the bonus event. In one embodiment, the total award for each participating gaming device is equal to the sum of awards associated with each collector of that participating gaming device.

In one embodiment, the total award determined for each gaming device participating in the bonus event is based, at least in part, on the number of collectors associated with the participating gaming device, the total number of collectors participating in the bonus event, wherein each collector is associated with one of the participating gaming devices, and the available awards. In one such embodiment, the bonus event includes predetermined quantity of awards. In one embodiment, each collector participating in the bonus event earns or is associated with one of the predetermined quantity of awards. The total award for each participating gaming device is based on the awards associated with the collectors of the participating gaming device.

In one embodiment, the controller randomly associates each accumulated collector participating in the bonus event with an award from the predetermined quantity of awards. In a further embodiment, the controller randomly assigns the lower-valued awards to the collectors before randomly assigning any higher-valued awards to any collectors. In another embodiment, the controller alternates assignment of awards of each value between the collectors of each participating gaming device. For example, if two gaming devices are participating in the bonus event, the controller assigns a collector associated with one of the gaming devices to an award of one value. The controller next assigns a collector associated with the other gaming device to an award of the same value. The controller continues alternating assignment of awards of each value between the collectors associated with the participating gaming devices until only collectors associated with one gaming device remain unassigned. The remaining unassigned collectors are each randomly assigned to an available award. In one embodiment, the controller assigns a certain percentage of collectors of each participating gaming device to awards of each value. The percentage of collectors assigned to awards of each value is thus based on the total number of collectors participating in the bonus event. In a further embodiment, the controller assigns a higher percentage of collectors of each participating gaming device to higher-valued awards if the total number of collectors is higher. It should be appreciated that other suitable methods for assigning awards to collectors can be utilized.

In one embodiment, the odds of obtaining a higher-valued award for each gaming device or player participating in the bonus event increase with the total number of collectors participating in the bonus event. In one such embodiment, the award for each gaming device or player participating in the bonus event is the sum of awards associated with the collectors of the gaming device or player. In this embodiment, each collector participating in the bonus event earns or is associated with one of a predetermined quantity of awards. The predetermined quantity of awards includes awards with high and low values. In one such embodiment, there are many more lower-valued than higher-valued awards, wherein to earn a higher-valued award for any collector, a certain number of other collectors participating in the bonus event must first earn or be associated with lower-valued awards. It should be appreciated that the quantity of awards could be determined in any suitable manner.

In another embodiment, one or more awards are group pay awards. In this embodiment, if any collector redeems such a group pay award, then all players participating in the bonus event will share at least a portion of the group pay award. Such an embodiment provides a modified level of volatility in the game. In different embodiments, the determination of how the group pay award is divided amongst the players participating in the bonus event is based on setting values relative to the total number of collectors for each player, based on giving the player whose collector redeemed the group pay award a larger portion of the group pay award, based on giving the player who triggered the bonus event a larger portion of the group pay award, predetermined, randomly determined, determined based on one or more player's status (such as determined through a player tracking system), determined based on a generated symbol or symbol combination, determined based on a random determination by the central controller, determined based on a random determination at the gaming machine, determined based on one or more side wagers placed, determined based on one or more primary game wagers, determined based on time (such as the time of day), determined based on an amount of coin-in accumulated in one or more pools or determined based on any other suitable method or criteria.

Various embodiments of the gaming system disclosed herein contemplates employing one or more displays in conjunction with the gaming machines which will provide the players of the gaming machines information about the bonus awards to increase player awareness of these awards and interaction between players of the gaming machines. The display(s) can provide any suitable information about the gaming system, gaming devices, bonus events and bonus event awards.

Accordingly, an advantage of the gaming system disclosed herein is to provide a gaming system having a plurality of gaming devices wherein multiple awards can be provided simultaneously or substantially simultaneously to players based on a single occurrence of a bonus triggering event.

Another advantage is to provide a gaming system having a plurality of gaming devices which are each associated with a certain amount of collectors and in which the odds of each gaming device earning higher-valued awards in the bonus event increase with the total number of collectors associated with the gaming devices participating in the bonus event.

Additional features and advantages are described herein, and will be apparent from, the following Detailed Description and the figures.

BRIEF DESCRIPTION OF THE FIGURES

FIGS. 4A, 4B, 4C, 4D, 4E, 4F, 4G, 4H, 4I and 4J are front elevational views of the plurality of gaming devices illustrating an example multiple-player bonus redemption game of one embodiment of the present disclosure.

DETAILED DESCRIPTION

The present disclosure may be implemented in various configurations for gaming machines, gaming devices or gaming systems, including but not limited to: (1) a dedicated gaming machine, gaming device, or gaming system wherein the computerized instructions for controlling any games (which are provided by the gaming machine or gaming device) are provided with the gaming machine or gaming device prior to delivery to a gaming establishment; and (2) a changeable gaming machine, gaming device, or gaming system where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
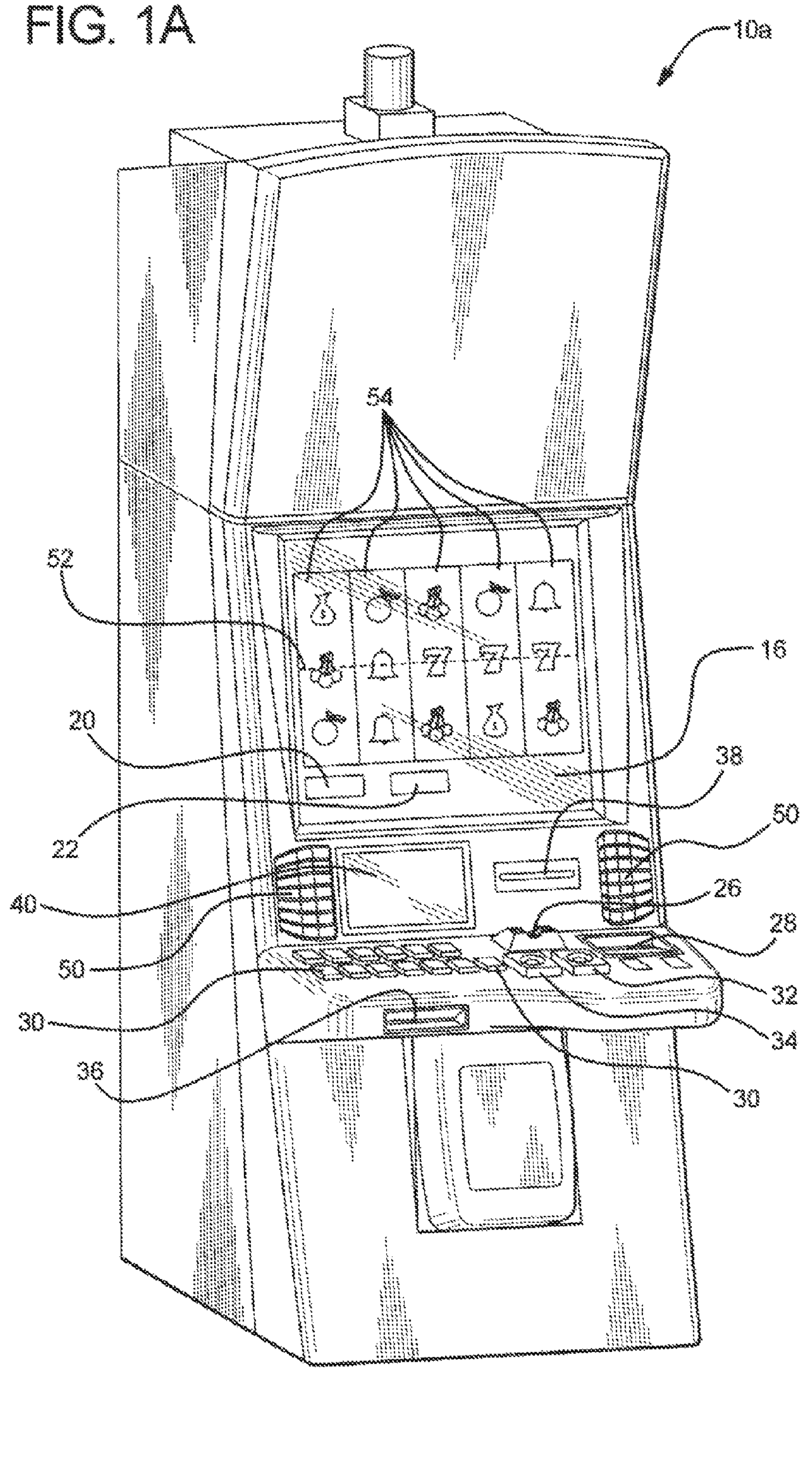
FIGS. 1A and 1B are perspective views of example alternative embodiments of the gaming device of the present disclosure.
Figure 1B:
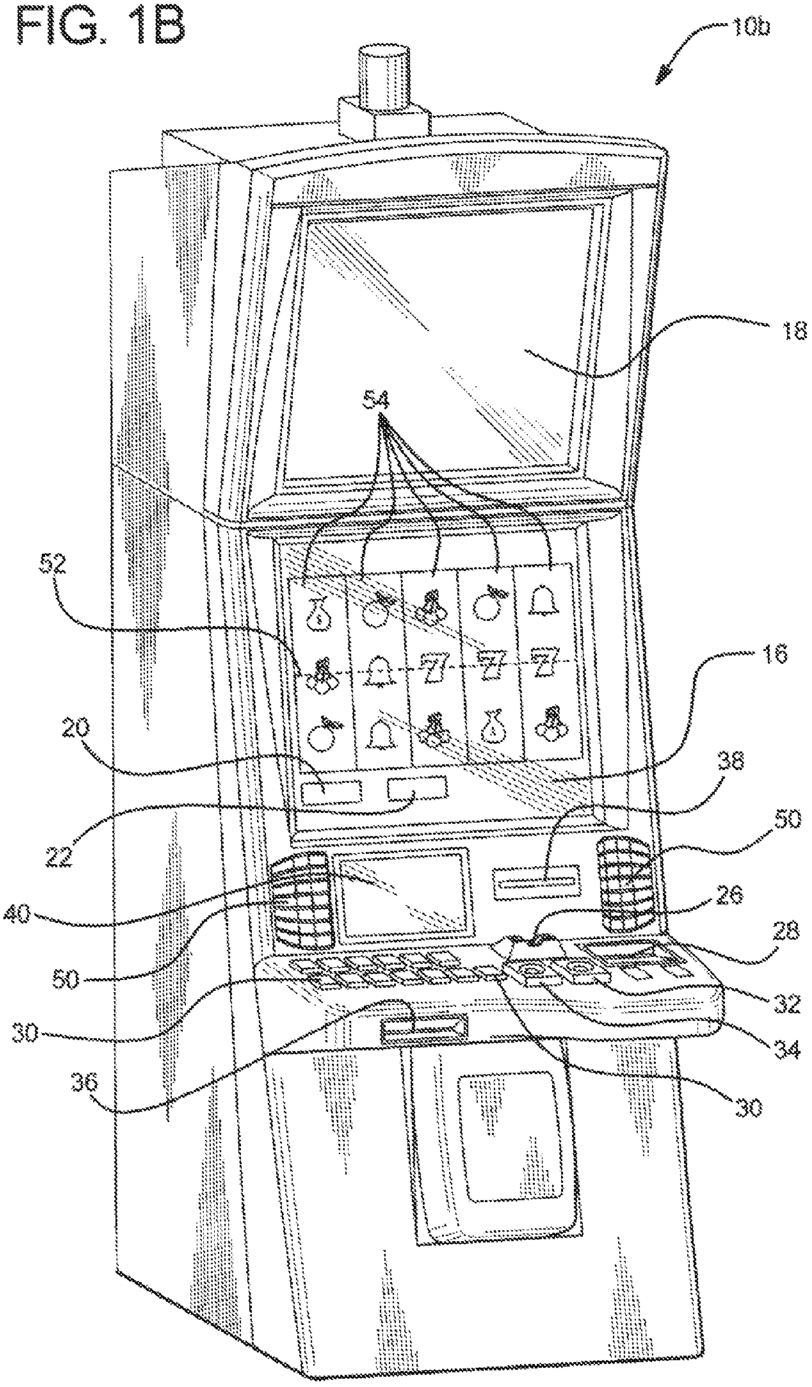

Referring now to the drawings, two example alternative embodiments of the gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
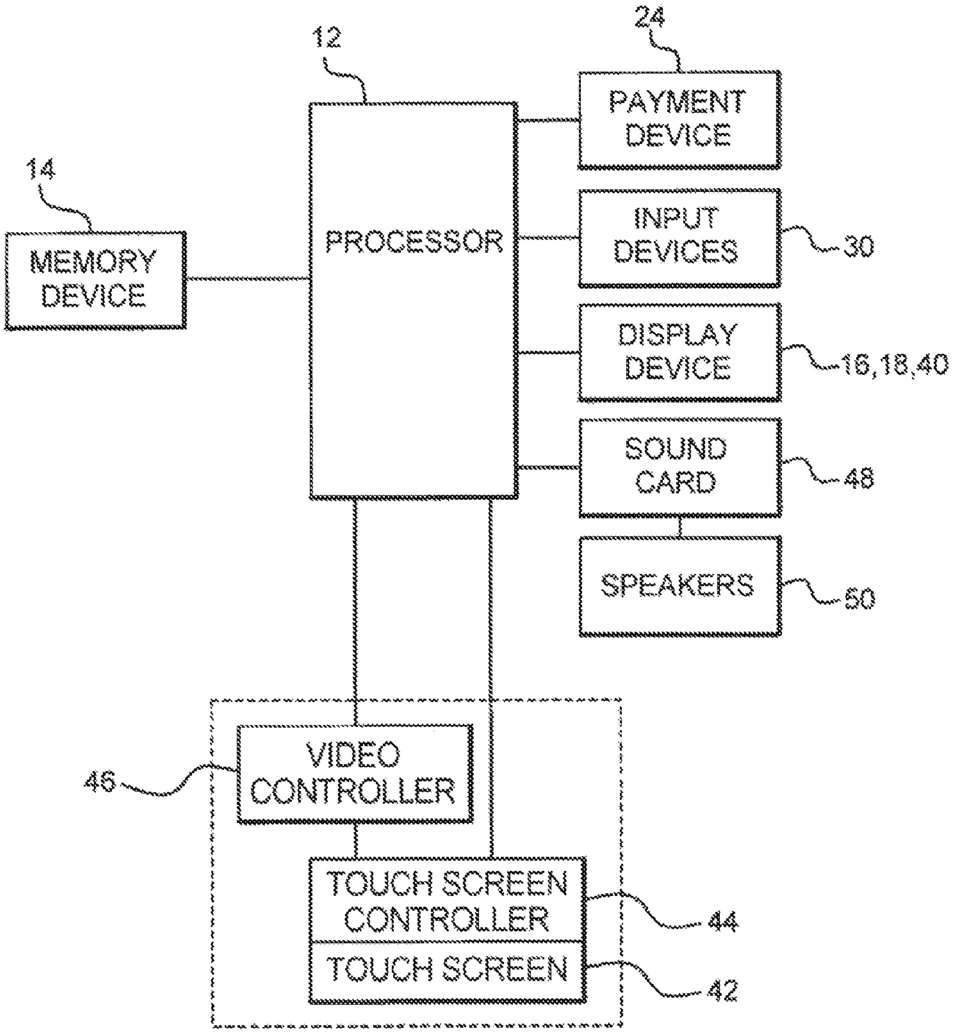
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (FDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a FDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus event or bonus or secondary round. The bonus event enables the player to obtain a prize or payout in addition to the prize or payout, if any, obtained from the base or primary game. In general, a bonus event produces a significantly higher level of player excitement than the base or primary game because it provides a greater expectation of winning than the base or primary game and is accompanied with more attractive or unusual features than the base or primary game. In one embodiment, the bonus event may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits; amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game; the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus event is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
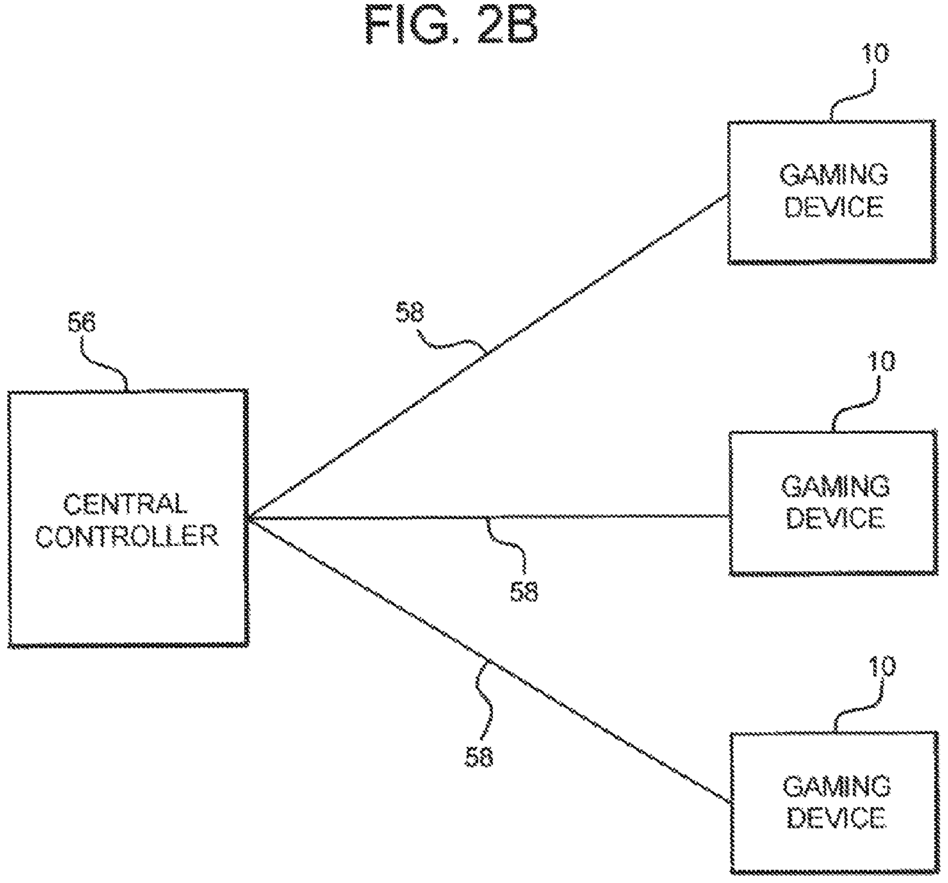
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, controller or remote host 56 through a data network or remote communication link 58. In this embodiment, the central server, controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the controller as disclosed herein may be performed by one or more gaming device processors. It should be further appreciated that one, more or each of the functions of one or more gaming device processors as disclosed herein may be performed by the controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the controller randomly selects or draws, one at a time, a plurality of the elements. As each element is selected, a determination is made for each gaming device as to whether the selected element is present on the bingo card provided to that enrolled gaming device. This determination can be made by the controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Multiple-Player Bonus Redemption Game

Figure 3:
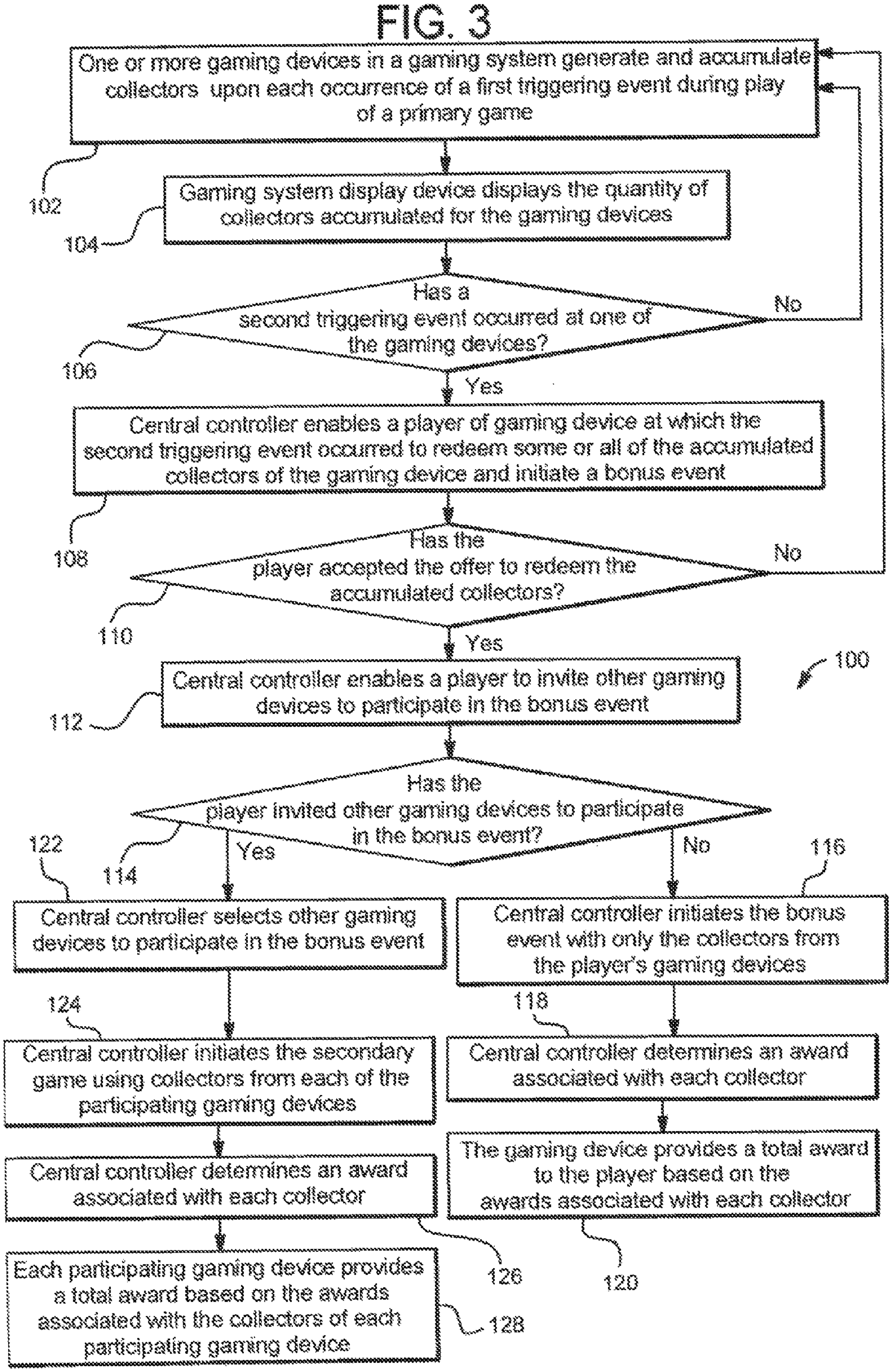
FIG. 3 is a flow chart illustrating one embodiment of the present disclosure.

Referring now to FIG. 3, in one embodiment, the gaming system of the present disclosure operates according to sequence 100. As indicated by block 102, one or more gaming devices in a gaming system generate and accumulate collectors upon each occurrence of a first or accumulated triggering event during play of a primary game. The collectors are redeemable in a bonus event and can be represented by any suitable symbol. It should also be appreciated that the first triggering event may alternatively occur in any other suitable manner besides in a play of the primary game. In various alternative embodiments, the first triggering event at a gaming device is randomly determined by the controller, randomly determined by the gaming device, determined based on time (such as the time of day or an amount of time between occurrences), determined based on an outcome of the primary game (such as a generated symbol or symbol combination), determined based on a player's status (such as determined through a player tracking system), or determined based on any other suitable method or criteria.

In one embodiment, the quantity of collectors provided (i.e., accumulated by the player) is based on the occurred accumulation triggering event. For example, if a plurality of designated symbols are generated in a scatter configuration, the quantity of collectors provided to the player is based on the number of designated symbols in the plurality of designated symbols. In different embodiment, the quantity of collectors provided (i.e., accumulated by the player) for each occurrence of the accumulation triggering event is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, one or more accumulated collectors are each associated with a modifier or multiplier. In this embodiment, if a collector is associated with a modifier, then any award associated with the collector in the bonus event (as described below) is modified by the applicable modifier or multiplier. In different embodiments, the modifier, if any, associated with one or more accumulated collectors is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, one or more collectors are group pay collectors. In one such embodiment, if any group pay collector is associated with an award as described herein, that associated award is provided to all of the players participating in the bonus event. In another such embodiment, if any group pay collector is associated with an award as described herein, that associated award is shared amongst all the players participating in the bonus event. Such embodiments provide a modified level of volatility in the game. In different embodiments, the quantity of group pay collectors in the game and/or the determination of how the award associated with any group pay collector is divided amongst the players participating in the bonus event is predetermined, randomly determined, determined based on one or more player's status (such as determined through a player tracking system), determined based on a generated symbol or symbol combination, determined based on a random determination by the central controller, determined based on a random determination at the gaming machine, determined based on one or more side wagers placed, determined based on one or more primary game wagers, determined based on time (such as the time of day), determined based on an amount of coin-in accumulated in one or more pools or determined based on any other suitable method or criteria.

In one embodiment, each gaming device in the gaming system provides a player of the gaming device the option to purchase additional collectors at any time during play of the primary game. In one such embodiment, each gaming device will display an input during play of the primary game and a message stating that the player may purchase additional collectors by using the input. In another embodiment, the players may only purchase additional collectors for a certain time period. In this embodiment, the gaming devices display the time limit within which the players must purchase the additional collectors.

In one such embodiment, the gaming system causes one or more collectors to expire after a certain time. Such collectors may be associated with a time of day, certain day(s) of week, a month and/or a year which they can be used. In this embodiment, the gaming devices display the time limit within which the collectors will expire (i.e., "your collectors will expire at 6:00 am tomorrow"). In one embodiment, such notice of expiration of any accumulated collectors is at the player's currently played gaming device. In another embodiment, such notice of expiration of any accumulated collectors is external from the player's currently played gaming device, such as via e-mail or a text message.

In one embodiment, a gaming system display device displays the quantity of collectors accumulated for the gaming devices as indicated by block 104. The gaming system display device can update the quantity of collectors respectively accumulated for the gaming devices: (i) continuously, (ii) upon each occurrence of a first triggering event at any one of the gaming devices, (iii) periodically (such as every five minutes), or (iv) based on any other suitable method or criteria. Alternatively or additionally, each gaming device display device displays the quantity of collectors accumulated for that gaming device.

As indicated by block 106, the controller determines whether a second triggering event has occurred at any one of the gaming devices. In one embodiment, the controller is a central server, central controller or remote host in communication with or linked to each of the plurality of gaming devices. In another embodiment, one of the plurality of gaming devices functions as the controller and is in communication with or linked to each of the other gaming devices. In different embodiments, the second triggering event at a gaming device is randomly determined by the controller, randomly determined by one or more of the gaming devices, determined based on time (such as the time of day or an amount of time between occurrences), determined based on an outcome of the primary game (such as a generated symbol or symbol combination), determined based on the quantity of accumulated collectors for said gaming device, determined based on a player's status (such as determined through a player tracking system), or determined based on any other suitable method or criteria.

In one embodiment, the second triggering event is the same as the first triggering event. For example, each time a collector is generated during play of the primary game, a player will have an opportunity to redeem a quantity of accumulated collectors and initiate the secondary game. This embodiment ensures that the given player has at least one collector to participate in the bonus event.

Once the controller determines that a second triggering event has occurred at one of the gaming devices, the controller enables a player of the gaming device at which the second triggering event occurred to redeem some or all of the accumulated collectors associated with the gaming device and initiate a bonus event as indicated by block 108. As indicated by block 110, the controller determines whether the player has accepted the offer to redeem the accumulated collectors associated with the gaming device. If the player declines to redeem any accumulated collectors in the bonus event, the player may return to playing plays of the primary game and continue to accumulate collectors. For example, a player may decline to redeem any accumulated collectors in the bonus event if the quantity of accumulated collectors is very small. The player may continue with plays of the primary game and attempt to accumulate a larger number of collectors before subsequently initiating or participating in the bonus event. In one such embodiment, if the player declines to participate in the bonus event, the gaming system provides the player one or more collectors as a consolation prize.

In one embodiment, the gaming system enables a player to decline to redeem any accumulated collectors in the bonus event as long as the player's accumulated collectors are less than a designated maximum number of accumulated collectors. In this embodiment, when the player's accumulated collectors reaches this designated maximum number of accumulated collectors, the player must participate in the bonus event. In another embodiment, when the player's accumulated collectors reaches this designated maximum number of accumulated collectors, each of the player's currently accumulated collectors increase in value, such as becoming associated with a multiplier or modifier.

As indicated by block 112, if the player accepts the offer to redeem accumulated collectors, in various embodiments, the controller enables the player to invite other gaming devices to participate in the bonus event. The player may decide whether to invite other gaming devices to participate in the bonus event based on the amount of accumulated collectors displayed on the gaming system display device for the other gaming devices. For example, the player may decline to invite other gaming devices to participate in the bonus event if none of the other gaming devices has accumulated a large quantity of collectors.

The controller determines whether the player has chosen to invite other gaming devices to participate in the bonus event as indicated by block 114. If the player declines to invite other gaming devices to participate in the bonus event, the controller enables the player to input a selected amount of accumulated collectors to redeem in the bonus event. This selected amount may be all of the accumulated collectors associated with the gaming device, half of the accumulated collectors associated with the gaming device, or any other suitable amount less than or equal to the total quantity of accumulated collectors associated with the gaming device.

In another embodiment, if the player accepts the offer to redeem one or more accumulated collectors, the gaming system enables the player to select which of a plurality of bonus redemption areas in which to conduct the bonus event. In one such embodiment, this selection occurs prior to inviting other players. In another such embodiment, this selection occurs after invitations to other players have been accepted or declined.

As indicated by block 116, in one embodiment, the controller initiates the bonus event using only the selected amount of accumulated collectors associated with the player's gaming device as indicated by block 116. The bonus event will include a quantity of awards which may be earned in the bonus event. In different embodiments, the quantity of awards is predetermined, randomly generated, dependent on the amount of accumulated collectors redeemed in the secondary game, or determined based on any other suitable method or criteria. In one embodiment, the controller determines an award earned by or associated with each collector as indicated by block 118. As indicated in block 120, the controller communicates the awards associated with the collectors to the gaming device and the gaming device provides a total award to the player based on the awards associated with the collectors. The total award can be the sum of awards associated with each collector, the sum of awards associated with some of the collectors, a multiplier of an award associated with a collector, or any other suitable award based on the awards associated with the collectors in the secondary game. In various alternative embodiments, one or more of the awards are free activations or spins, bonus games, or other award opportunities.

If the player chooses to invite other gaming devices to participate in the secondary game, the controller enables the player to input a selected amount of accumulated collectors to redeem in the secondary game. This selected amount can be all of the accumulated collectors associated with the gaming device, half of the accumulated collectors associated with the gaming device, or any other suitable amount less than or equal to the total quantity of accumulated collectors associated with the gaming device. In various embodiments, amounts to redeem can be operator selected (i.e., the player can choose one of a plurality of different designated quantities) or player selected. In another embodiment, the gaming system enables a player to input a selected amount of accumulated collectors to redeem in the bonus event after any invited players have inputted an amount of accumulated collectors they will redeem in the bonus event. That is, in this embodiment, the triggering player invites other players to join the bonus event and then after other players have committed zero, one or more of their accumulated collectors to the triggered bonus event will the triggering player commit zero, one or more of their accumulated collectors to the triggered bonus event.

As indicated by block 122, in one embodiment, the controller selects other gaming devices to participate in the secondary game. In another embodiment, the controller causes the gaming device at which the second triggering event occurred to display the other gaming devices in the gaming system. In this embodiment, the player can then input or select the other gaming devices to invite to participate in the secondary game. In these embodiments, the controller causes each of the selected or invited gaming devices to display to a player of that gaming device the option to participate in the secondary game. The controller determines which players have accepted the invitation to participate in the secondary game.

In another embodiment, the player at the gaming device at which the second triggering event occurred can invite a plurality, but not all, of the players in the gaming system to join to participate in the bonus event. In one such embodiment, the players which can be invited to participate in the bonus event is based on the triggering player's status (such as determined through a player tracking system). For example, if a gold level player triggered the bonus event, that gold level player may invite other gold level players and lower silver level players to participate in the bonus event. In another embodiment, the players which can be invited to participate in the bonus event is based on each other player's respective quantity of accumulated collectors. For example, if a triggering player has a lower relative quantity of collectors, that triggering player can only invite players with relatively low and medium quantities of collectors to participate in the bonus event. In different embodiments, the players which can be invited to participate in the bonus event is predetermined, randomly determined, determined based on, determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In one embodiment, the gaming system enables one or more players to input or otherwise specify one or more rules regarding inviting other players to participate in a bonus event and/or accepting other player's invitations to participate in bonus events. In one such embodiment, a player specifies one or more rules by which the player will automatically participate in a bonus event (and thus the gaming system will skip the step of enabling the player to accept or decline an invitation). In another embodiment, the gaming system specifies one or more rules regarding invitations to participate in bonus events and/or acceptance of invitations to participate in bonus events. For example, if a plurality of players form a team or group as described below, the controller specifies that if one member of the team or group triggers a bonus event, all members of that team or group are invited to participate in the bonus event.

The controller initiates the bonus event using accumulated collectors associated with each of the participating gaming devices as indicated by block 124. In one embodiment, the controller enables each player of each participating gaming device to input the amount of accumulated collectors associated with such participating gaming device to be redeemed in the bonus event. Alternatively, the controller enables only the player of the gaming device at which the second triggering event occurred to input the amount of accumulated collectors to redeem in the bonus event. In this embodiment, for all other participating gaming devices, the controller will initiate the bonus event using all of the accumulated collectors associated with, respectively, those gaming devices or the same percentage of collectors associated with the player at the gaming device which the second triggering event occurred.

The bonus event includes a quantity of awards. In different embodiments, the quantity of awards is predetermined, randomly generated, dependent on the amount of accumulated collectors redeemed in the bonus event, or determined based on any other suitable method or criteria. In one embodiment, the quantity of awards is greater than the total quantity of accumulated collectors redeemed in the bonus event. In another embodiment, the quantity of awards is equal to the total quantity of accumulated collectors redeemed or participating in the bonus event. In different embodiments, the value of the awards in the bonus event is predetermined, randomly generated, determined based on the types of second triggering events, determined based on a player tracking system for the participating player(s), based on the player bet size when the collector is earned, dependent on the amount of accumulated collectors redeemed in the bonus event, or determined based on any other suitable method or criteria.

In one embodiment, the controller determines an award associated with each collector as indicated by block 126. As indicated in block 128, the controller communicates the awards associated with the collectors to the participating gaming devices and each participating gaming device provides a total award based on the awards associated with the collectors of the participating gaming device. The total award may be the sum of awards associated with each collector of the participating gaming device, the sum of awards associated with certain of the collectors of the participating gaming device, a multiplier of an award associated with one or more collectors of the participating gaming device, or any other suitable award based on the awards associated with the collectors of the participating gaming device in the bonus event.

In one embodiment, the controller associates each collector with one of the awards in the bonus event. In one embodiment, two or more of the awards in the bonus event have equal values. In another embodiment, the awards in the bonus event each have different values. In further embodiments, the bonus event includes different distributions of higher-valued and lower-valued awards. In one embodiment, the awards in the bonus event have positive values, negative values or values of zero. In this embodiment, certain collectors may earn or be associated with negative awards, such as a terminator.

In one embodiment, the odds of obtaining a higher-valued total award for any participating gaming device increase with the total number of collectors redeemed or participating in the bonus event. Thus, in this embodiment, the more players with more collectors participating in the bonus event can lead to players obtaining the higher value awards. In one such embodiment, the award for each gaming device or player participating in the bonus event is based on the awards associated with the collectors of that gaming device. Each collector participating in the bonus event earns or is associated with one of a predetermined quantity of awards.

In one embodiment, if there are many more lower-valued than higher-valued awards, for any collector to earn a higher-valued award, a certain number of other collectors participating in the bonus event must first earn or be associated with lower-valued awards. In another embodiment, each of the lower-valued awards must be associated with a collector before any higher-valued award may be associated with any collectors. This embodiment may encourage certain players to invite other players to join the bonus event to obtain such higher-valued awards. For example, if there are twenty lower-valued awards, a designated player has ten collectors and each of the lower-valued awards must be associated with a collector before any higher-valued award may be associated with any collectors, it would be to the designated player's advantage to invite other players to participate in the bonus event to bring the total number of collectors in the bonus event to greater than twenty, such that one of the designated player's collectors has a chance at being associated with a higher-valued award.

In another embodiment, the variation in potential award size increase with the total number of collectors. Thus a smaller number of collectors is likely to redeem awards of a limited range of value whereas a larger number of collectors is likely to redeem a full range of values, both smaller and larger, than the limited range available to the smaller number of collectors.

In another embodiment, if each of the awards of the bonus event is associated with a collector (i.e., the players have completed the first stage or level of the bonus event), the gaming system provides another array of awards and associates any remaining collectors with the awards in this array of awards. In one such embodiment, this array (i.e., the next stage or level of the bonus event) includes greater value awards than the previous array of the bonus event.

In another embodiment, one or more awards are group pay awards. In this embodiment, if any collector redeems such a group pay award, then all players participating in the bonus event will share at least a portion of the group pay award. Such an embodiment provides a modified level of volatility in the game. In different embodiments, the determination of how the group pay award is divided amongst the players participating in the bonus event is based on setting values relative to the total number of collectors for each player, based on giving the player whose collector redeemed the group pay award a larger portion of the group pay award, based on giving the player who triggered the bonus event a larger portion of the group pay award, predetermined, randomly determined, determined based on one or more player's status (such as determined through a player tracking system), determined based on a generated symbol or symbol combination, determined based on a random determination by the central controller, determined based on a random determination at the gaming machine, determined based on one or more side wagers placed, determined based on one or more primary game wagers, determined based on time (such as the time of day), determined based on an amount of coin-in accumulated in one or more pools or determined based on any other suitable method or criteria.

It should be appreciated that the shared bonus redemption game as described above may be employed in any suitable gaming system. In one embodiment, the gaming system includes a plurality of gaming devices utilized by players associated with teams. In one such embodiment, a team may be organized based on a list, such as a buddy list. All collectors generated and accumulated by players on the buddy list are credited to the team. When a second triggering event occurs for a gaming device associated with one of the players on the buddy list, the team can invite another team of players to redeem collectors in the bonus event.

In another embodiment, the gaming system includes a single gaming device with one player and a number of other simulated or virtual players. In different embodiments, the number of other simulated or virtual players is predetermined, randomly determined, determined based on the player's status (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria. In such embodiments, when a second triggering event occurs for the gaming device associated with the player, the player can invite at least one other simulated or virtual player to redeem collectors in the bonus event. In another embodiment with virtual players, such virtual players may invite live players to redeem a bonus redemption triggered by the virtual player. It should be appreciated such virtual players increase the volatility of the gaming system disclosed herein.

FIGS. 4A, 4B, 4C, 4D, 4E, 4F, 4G, 4H, 4I and 4J illustrate screen shots of one embodiment of the present disclosure wherein one of the plurality of gaming devices provides a player the option to redeem collectors in a bonus event and invite players of the other gaming devices in the plurality of gaming devices to join in the bonus event. In this embodiment, the plurality of gaming devices includes gaming devices 10*a*, 10*b*, and 10*c*, which each include a primary game with a plurality of symbols and paylines, wherein each gaming device enables a player to wager an amount on a plurality of the paylines in the primary game. In this illustrated embodiment, display devices 140, 160, and 180 display paylines 144, 146, 148, 164, 166, 168, 184, 186, and 188. The display devices also include award indicators or displays 150, 170, and 190 and collector indicators or displays 142, 162, and 182. For each gaming device, after a player wagers an amount on one or more of the paylines, the gaming device displays a plurality of symbols. In one embodiment, each gaming device determines whether any winning symbol combinations are displayed and provides any awards for any determined winning symbol combinations. Each gaming device also determines whether a first triggering event has occurred. For each gaming device, when a first triggering event occurs, said gaming device generates a determined quantity of collectors. Upon each subsequent occurrence of the first triggering event or collector generation or accumulation triggering event, the gaming device accumulates one or more additional collectors.

When a second triggering event or collector redemption event occurs at or for one of the gaming devices, the gaming device at which the second triggering event occurred enables a player to redeem a quantity of collectors accumulated on the gaming device and participate in a bonus event. If the player requests redemption of the quantity of accumulated collectors, the gaming device provides the further option to invite players of other gaming devices in the gaming system to participate in the bonus event. If the player declines to invite players of other gaming devices to participate in the bonus event, the controller provides the bonus event using the collectors associated with the gaming device at which the second triggering event occurred. The controller determines any awards associated with the collectors in the bonus event and communicates those awards to the gaming device. The gaming device provides a total award in the bonus event. On the other hand, if the player chooses to invite players of other gaming devices to participate in the bonus event, the controller determines which gaming devices will participate in the bonus event and provides the bonus event to the participating gaming devices using the collectors associated with said participating gaming devices. The controller determines any awards associated with the collectors in the bonus event and communicates those awards to the participating gaming devices. The participating gaming devices provide a total award in the bonus event.

Figure 4A:
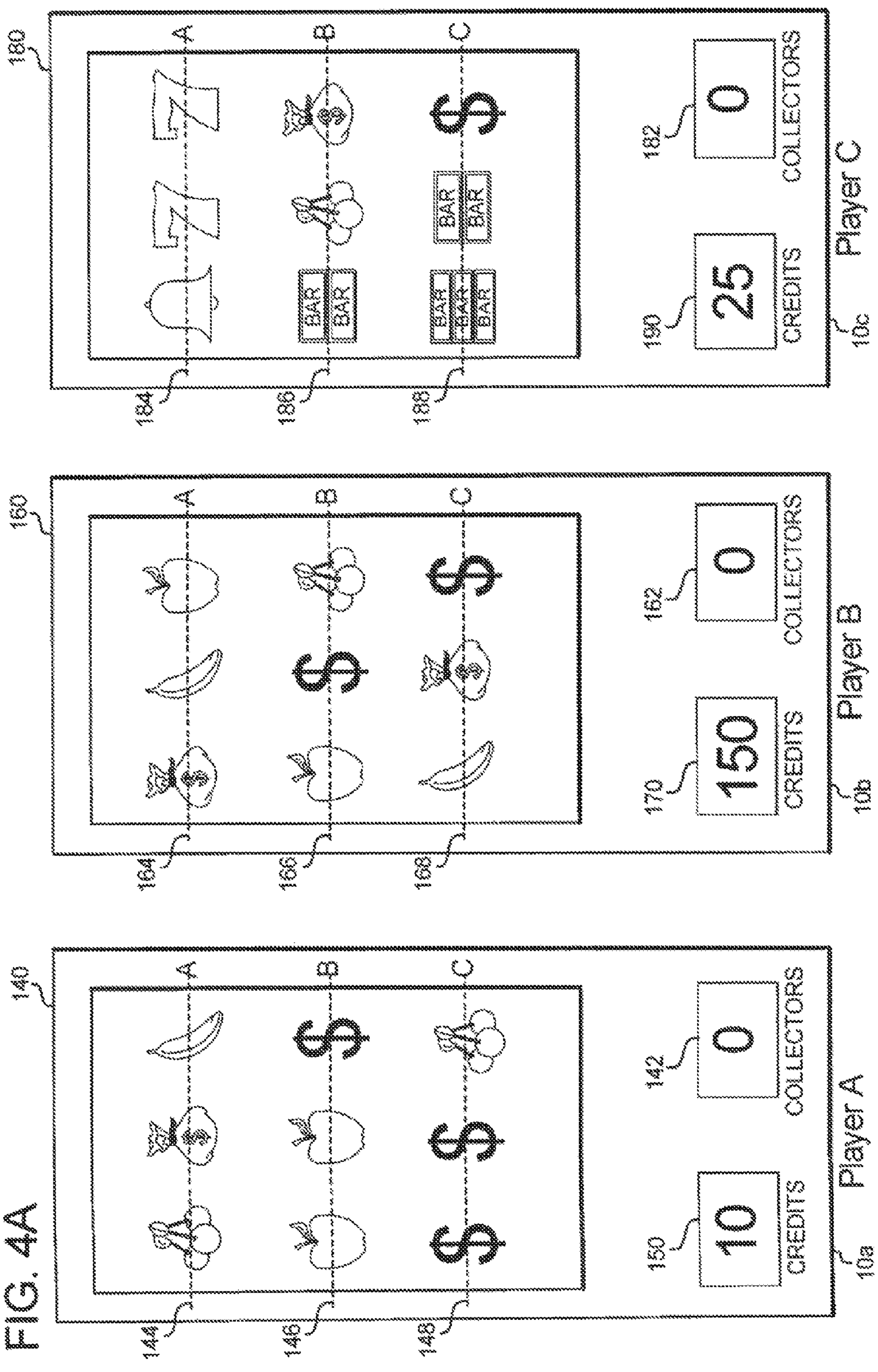

As illustrated in FIG. 4A, gaming devices 10*a*, 10*b*, and 10*c* are associated with Players A, B, and C, respectively. Display devices 140, 160, and 180 display symbols in a primary game. Award indicators 150, 170, and 190 display the total number of credits for each player, and collector indicators 142, 162, and 182 display the total number of collectors for each player. Players A has 10 credits, Player B has 150 credits, and Player C has 25 credits. Players A, B, and C each have zero collectors.

It should be appreciated that the plurality of gaming machines in the gaming system may be in the same bank of machines, in the same casino or gaming establishment (usually through a local area network ("LAN")) or in two or more different casinos or gaming establishments (usually through a wide area network ("WAN")). It should be further appreciated that the players of the gaming devices in the gaming system may be identified in any suitable manner or method. In one embodiment, the players are identified by a handle. In another embodiment, the players are identified by a nickname. In one embodiment, the players are identified by screen names.

It should be appreciated that the total number of collectors for each player can be associated with the gaming devices or players in any suitable manner. In one embodiment, the total number of collectors for each player is associated with the gaming device. In one such embodiment, the credits and collectors for each player must be redeemed by the player before leaving the gaming device. Any collectors not redeemed by the player before leaving the gaming device may be redeemed by any subsequent players of the gaming device. In another embodiment, the total number of collectors for each player is associated with the player's account. In one such embodiment, when a player enters or inputs the player's account information into a gaming device (such as via a player tracking card), the gaming device stores the player's account information and credits all collectors earned by the player at that gaming device to the player's account. Any collectors not redeemed by the player before leaving the gaming device can be redeemed later by the player at another gaming device in the gaming system. For example, if Player A input her account information to gaming device 10*a* and ten collectors were generated on gaming device 10*a* while Player A was at the gaming device, the ten collectors would be stored in Player A's account. Player A could then leave gaming device 10*a* and play on gaming device 10*b*. If Player A triggered a bonus event on gaming device 10*b*, Player A could redeem the ten collectors generated at gaming device 10*a* in a bonus event at gaming device 10*b*.

Figure 4B:
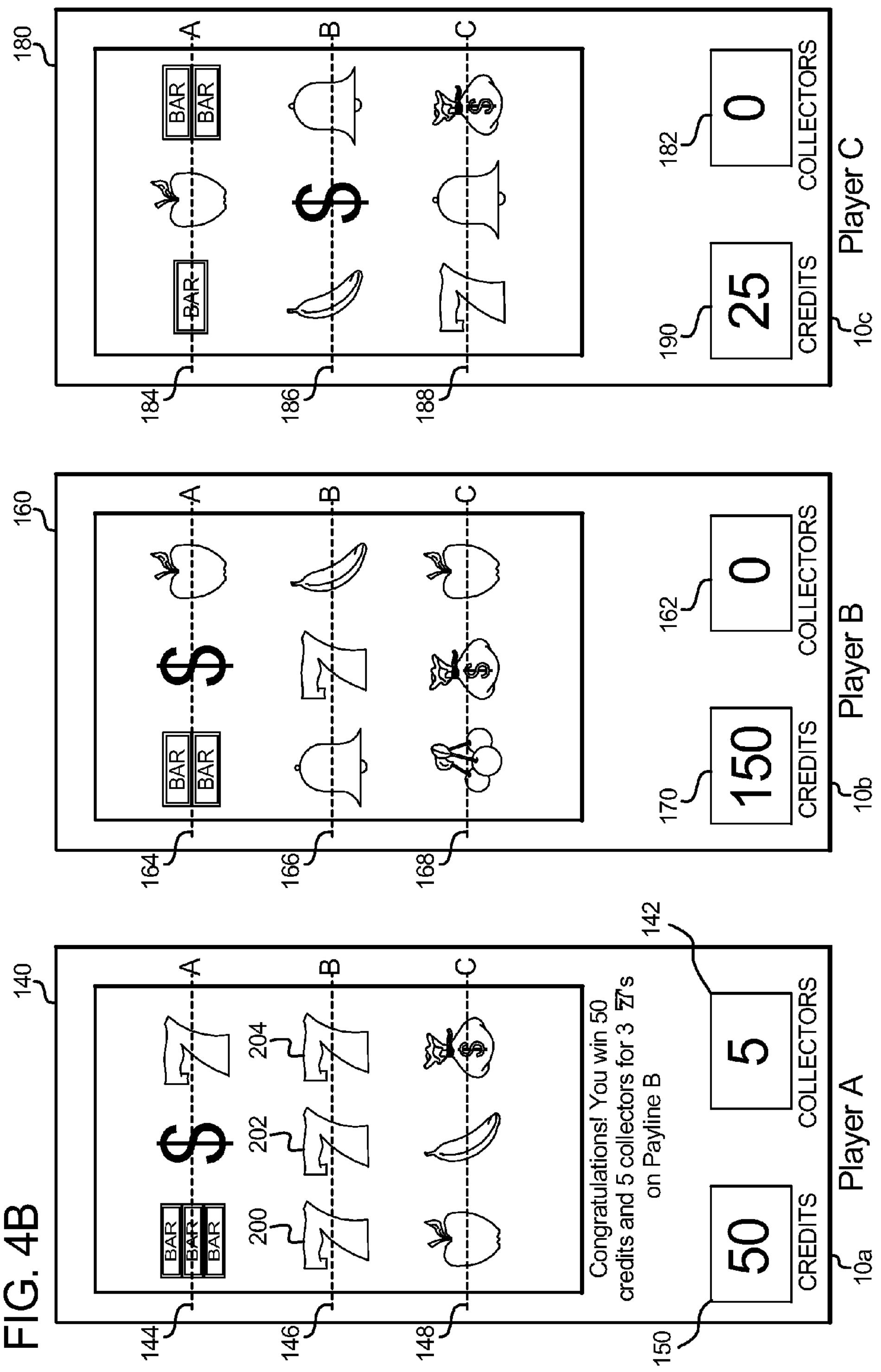

As illustrated in FIG. 4B, after a play of the primary game, gaming devices 10*a*, 10*b*, and 10*c* display a plurality of symbols. Gaming device 10*a* determines that a winning symbol combination is displayed on payline B 146 and awards Player A fifty credits for the three "7" symbols 200, 202, and 204. Gaming device 10*a* also determines that a first triggering event has occurred and generates five collectors for the three "7" symbols 200, 202, and 204. In this embodiment, the first triggering event is a winning symbol combination of three "7" symbols on a single payline in the primary game. The display device 140 generates a message indicating that Player A has been awarded fifty credits and five collectors for the three "7" symbols and displays the total award in award indicator 150 and the total accumulated collectors in collector indicator 142.

It should be appreciated that the first triggering event can be determined by any suitable criteria. In one embodiment, the first triggering event is independent of any play or outcome in the primary game. For example, in one embodiment, the first triggering event is randomly determined by the controller. In another such embodiment, the first triggering event is randomly determined by the gaming device. In one such embodiment, the first triggering event is determined based on time (such as the time of day or an amount of time between occurrences). In another embodiment, the first triggering event is determined based on an outcome of the primary game (such as a generated symbol or symbol combination). In one embodiment, the first triggering event is determined based on a player's status (such as determined through a player tracking system). In another embodiment, the triggering event is determined by the controller.

Figure 4C:
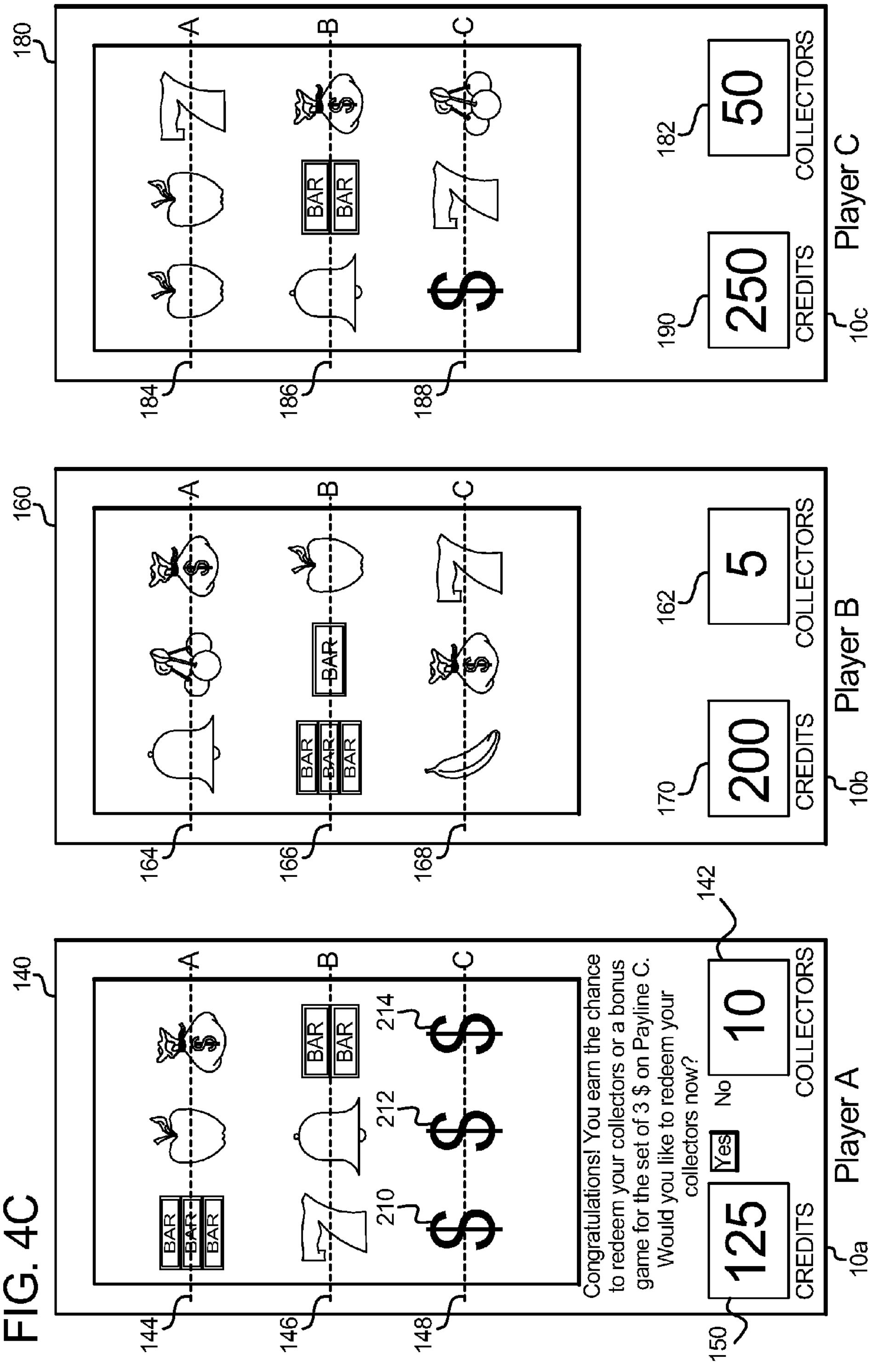

As illustrated in FIG. 4C, after one or more plays of the primary game, award indicators 150, 170, and 190 and collector indicators 142, 162, and 182 show that Player A has won 125 credits and accumulated 10 collectors, Player B has won 200 credits and accumulated 5 collectors, and Player C has won 250 credits and accumulated 50 collectors. In this example, gaming devices 10*a*, 10*b*, and 10*c* display a plurality of symbols and gaming device 10*a* determines that a second triggering event has occurred. In this embodiment, the second triggering event is a winning symbol combination of three "$" symbols on a single payline in the primary game. The display device 140 generates a message indicating that Player A has earned the chance to redeem the players accumulated collectors in a bonus event for the set of three "$" symbols 210, 212, and 214 on payline C. The display device 140 displays the option for Player A to redeem player's collectors in a bonus event. Player A chooses to redeem player's collectors in a bonus event.

It should be appreciated that the second triggering event can be determined by any suitable criteria. In one embodiment, the second triggering event at a gaming device is independent of any play or outcome in the primary game. For example, in one such embodiment, the second triggering event is randomly determined by the controller. In another such embodiment, the second triggering event at a gaming device is randomly determined by the gaming device. In one such embodiment, the second triggering event is determined based on time (such as the time of day or an amount of time between occurrences of the second triggering event). In another embodiment, the second triggering event is determined based on an outcome of the primary game (such as a generated symbol or symbol combination). In one embodiment, the second triggering event at a gaming device is determined based on the quantity of accumulated collectors for said gaming device. For example, once said gaming device has accumulated fifty collectors, the gaming device determines that a second triggering event has occurred and provides a player of the gaming device the option to redeem accumulated collectors in a bonus event. In another embodiment, the second triggering event is determined based on a player's status (such as determined through a player tracking system).

In one embodiment, the second triggering event may be the same as the first triggering event. For example, each time the player is offered an opportunity to redeem a quantity of accumulated collectors in a bonus event, a designated number of collectors are generated during play of the primary game. In an alternative embodiment, the second triggering event is different than the first triggering event and thus does not generate collectors. In one such embodiment, if the second triggering event occurs at or for a gaming device before a first triggering or collector generation event, the player of that gaming device will not be provided the option to participate in a bonus event because the player does not have any accumulated collectors to redeem in the bonus event.

Figure 4D:
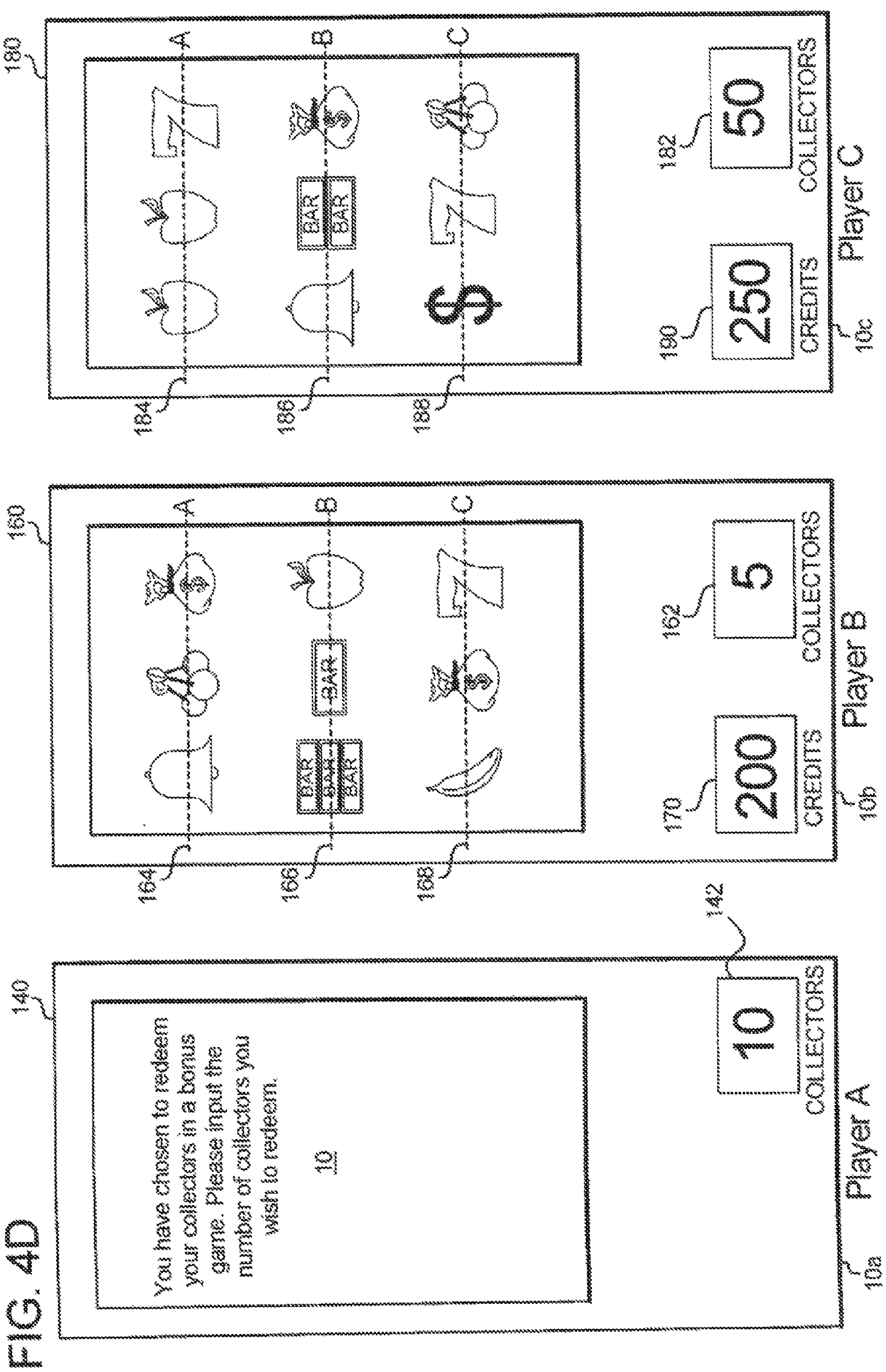

As illustrated in FIG. 4D, display device 140 generates a message indicating that Player A has chosen to redeem a quantity of accumulated collectors in a bonus event. In this embodiment, display device 140 prompts the player to input the quantity of collectors to redeem in the bonus event. Player A chooses to redeem all of her ten accumulated collectors in the bonus event.

It should be appreciated that the quantity of collectors to be redeemed in the bonus event can be determined for each participating player or gaming device in any suitable manner. In one embodiment, the participating gaming device prompts the player to choose to redeem either all or a designated quantity of the accumulated collectors in the bonus event. In another embodiment, the gaming device determines the quantity of accumulated collectors to be redeemed in the bonus event. In one embodiment, the controller determines the quantity of collectors to be redeemed in the bonus event. In another embodiment, all of the player's accumulated collectors must be redeemed in the bonus event. In one embodiment, only a designated amount such as half of the player's accumulated collectors may be redeemed in the bonus event.

Figure 4E:
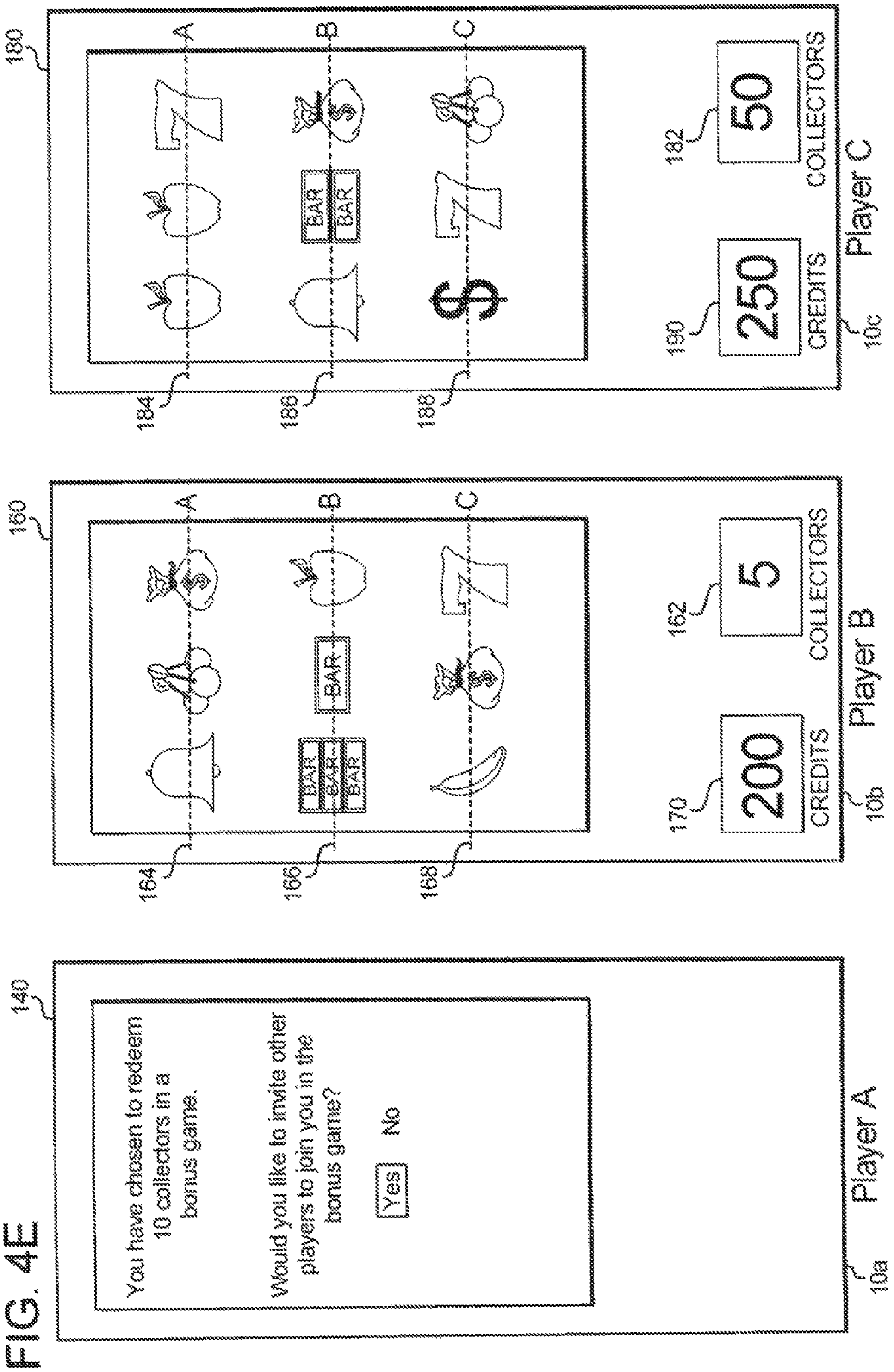
Figure 4F:
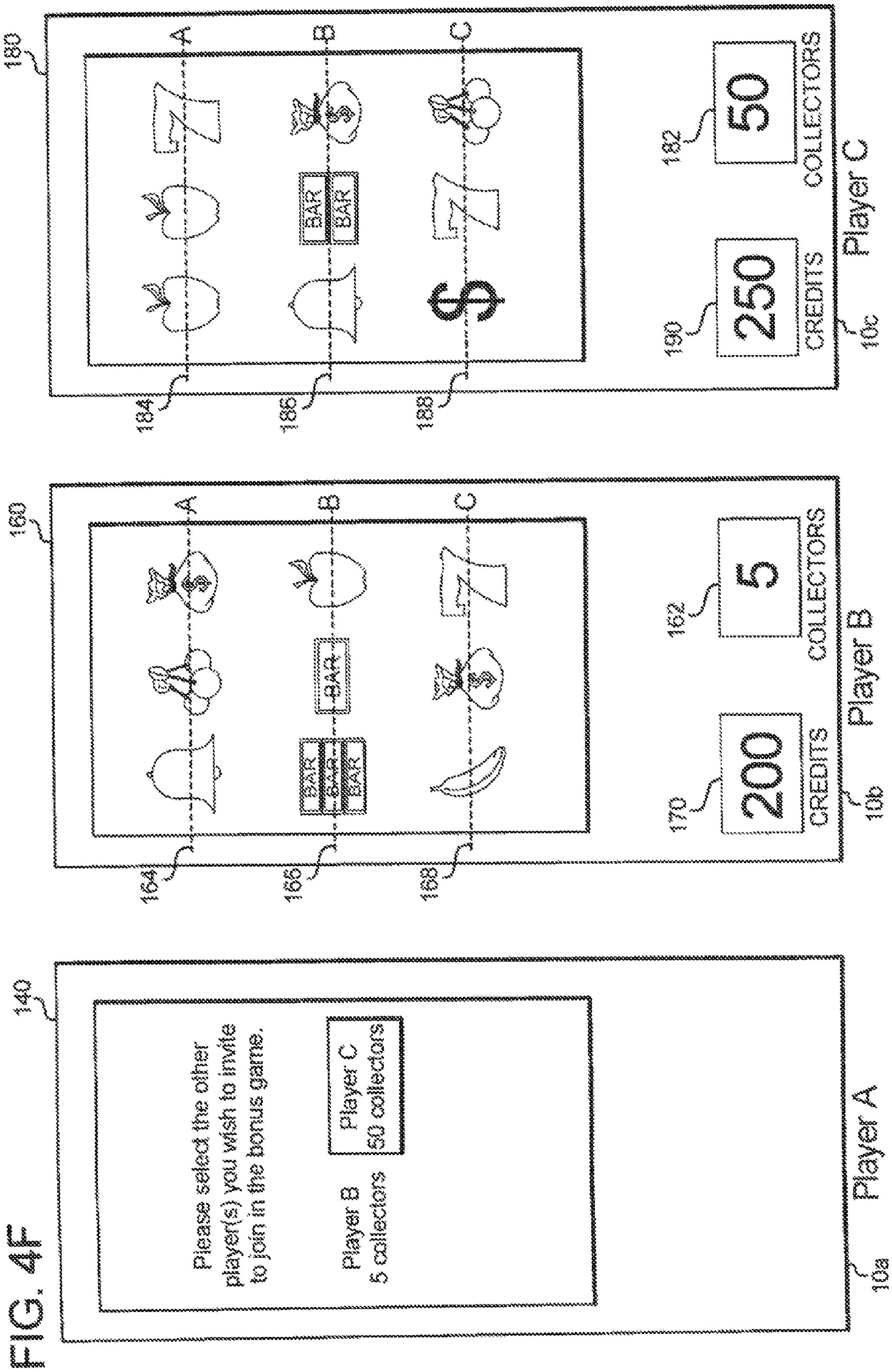

As illustrated in FIG. 4E, display device 140 generates a message indicating that Player A has chosen to redeem ten collectors in the bonus event. Display device 140 displays the option for Player A to invite players of other gaming devices in the gaming system to participate in the bonus event. Player A chooses to invite players of other gaming devices to join in the bonus event. As illustrated in FIG. 4F, gaming device 10*a* prompts Player A to select other players to invite to participate in the bonus event. In this embodiment, display device 140 displays the players of the other gaming devices in the gaming system, Players B and C, along with the number of accumulated collectors associated with each player. Player A selects Player C to invite to participate in the bonus event. In another embodiment (not shown), the gaming device simultaneously enables the player to invite zero, one or more players to participate in the bonus event. In this embodiment, the gaming device displays the players of the other gaming devices in the gaming system, along with the number of accumulated collectors associated with each player and enables the player to invite one or more of these players or to play the bonus event alone and not invite any of these other players.

It should be appreciated that any suitable manner of enabling a player of the gaming device at which the second triggering event occurred to select players of other gaming devices in the gaming system to invite to participate in the bonus event may be utilized. In one embodiment, the gaming device at which the second triggering event occurred displays the players of the other gaming devices in the gaming system, but not the number of accumulated collectors associated with each player, and enables the player to select other players to invite to participate in the bonus event. In another embodiment, the controller causes a group or community display device to display to the players of the other gaming devices in the gaming system and enables the player of the gaming device at which the second triggering event occurred to select other players to invite to participate in the bonus event.

In one embodiment, the controller or the gaming device at which the second triggering event occurred enables the player to simultaneously select other players to invite to participate in the bonus event. For example, in one such embodiment, Player A could have invited both Players B and C to participate in the bonus event at the same time. In another embodiment, the controller or the gaming device at which the second triggering event occurred enables the player to sequentially select other players to invite to participate in the bonus event. In one such embodiment, for example, Player A could have invited Player C to participate in the bonus event, and if Player C declined or accepted but chose to redeem less than all of her collectors, Player A could have invited Player B to participate in the bonus event.

It should be appreciated that a second triggering event may occur simultaneously at more than one of the plurality of gaming devices. In one embodiment, the controller determines that a second triggering event has occurred at more than one gaming device in the gaming system. The gaming devices at which the second triggering event occurred provide the players of those gaming devices the option to invite other players of the plurality of gaming devices to participate in their respective bonus events. The other players may choose to participate in one or more of the bonus events. If the other players choose to participate in more than one bonus event, the other players may redeem certain of their collectors in one bonus event and certain others of their collectors in the other bonus event(s). In one such embodiment, each gaming device at which the second triggering event occurred displays the bonus event associated with that gaming device. In another embodiment, the controller causes a group or community display device to display all bonus events. For example, if a second triggering event had occurred at gaming devices 10*a* and 10*b*, gaming devices 10*a* and 10*b* would provide Players A and B, respectively, the option to invite Player C to participate in their respective bonus events. If Player C accepted the invitation to participate in both bonus events, Player C could redeem twenty-five of her fifty collectors in Player A's bonus event and the other twenty-five of her fifty collectors in Player B's bonus event. The controller could display Player A's and Player B's bonus events.

Figure 4G:
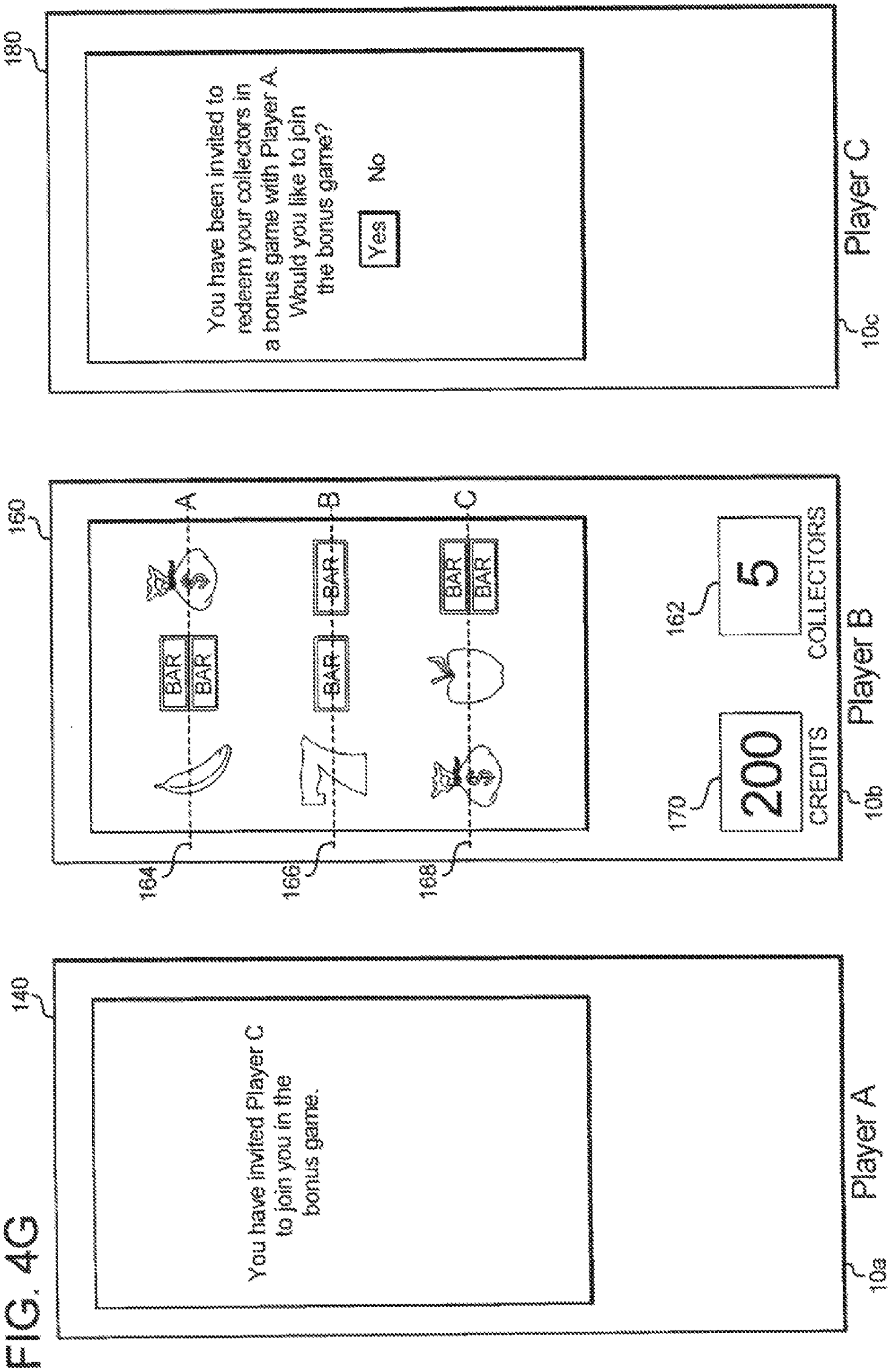

As illustrated in FIG. 4G, in this embodiment, display device 140 generates a message indicating that Player A has invited Player C to participate in the bonus event. Display device 180 generates a message indicating that Player C has been invited by Player A to participate in the bonus event. Display device 180 displays the option for Player C to participate in the bonus event. Player C chooses to participate in the bonus event. The controller determines that gaming devices 10*a* and 10*c* will participate in the bonus event.

It should be appreciated that any suitable method or manner of enabling players of other gaming devices in the gaming system to accept an invitation to participate in the bonus event may be employed. In one embodiment, each gaming device invited to participate in the bonus event provides a list or display of the other invited gaming devices and the gaming device at which the second triggering event occurred as well as the number of collectors accumulated on or associated with each such gaming device. In one embodiment, the players of the other gaming devices invited to participate in the bonus event have a time limit within which to accept the invitation to participate in the bonus event. In a further embodiment, the other gaming devices invited to participate in the bonus event display or indicate the time limit to the players of such other gaming devices.

It should be appreciated that any suitable method or manner of determining which gaming devices in the gaming system will participate in the bonus event may be employed. In one embodiment, the controller selects the gaming devices that will participate in the bonus event without any input from the players. In another embodiment, the gaming device at which the second triggering event occurred selects the gaming devices that will participate in the bonus event without any input from the players.

In one embodiment, after the controller has determined which gaming devices will participate in the bonus event, Player C is provided with the option to rescind her acceptance to participate in the bonus game. In one such embodiment, if Player A had invited Players B and C to participate in the bonus event and Player B had chosen not to participate in the bonus event or to participate in the bonus event but to redeem less than all of her collectors, display device 180 would provide Player C with the option to rescind her acceptance to participate in the bonus event. In another embodiment, after the controller has determined which gaming devices will participate in the bonus event, Player A is provided with the further option of canceling the bonus event. In one such embodiment, if Player C had chosen (i) not to participate in the bonus event, (ii) to participate in the bonus event but to redeem less than all of her collectors, or (iii) to rescind her acceptance to participate in the bonus game within a certain time, display device 140 would provide Player A with the option to cancel the bonus event.

Figure 4H:
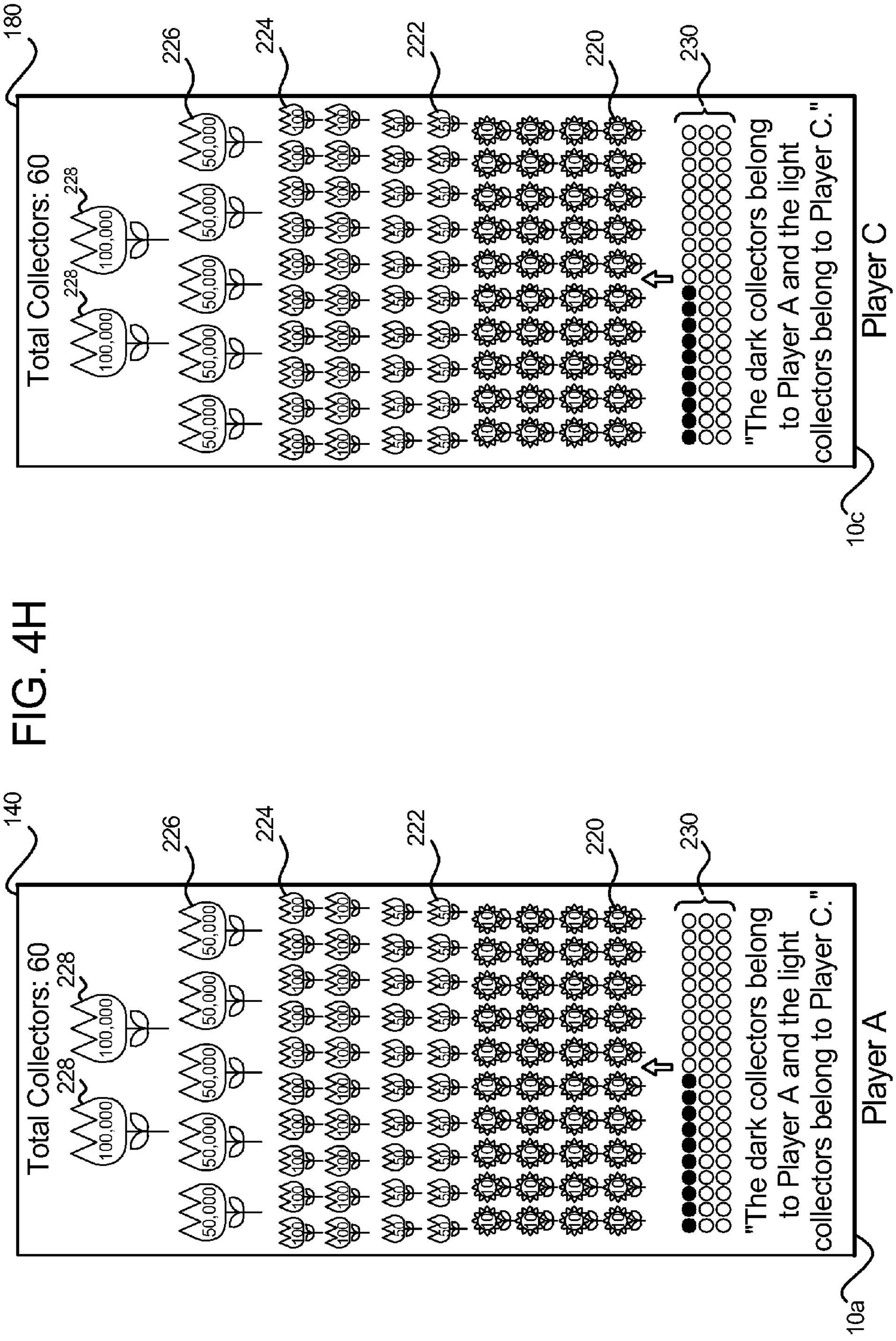

As illustrated in FIG. 4H, the controller provides the bonus event to gaming devices 10*a* and 10*c*. In this embodiment, gaming devices 10*a* and 10*c* display the bonus event and the total number of collectors participating in the bonus event. Player A chose to redeem ten collectors in the bonus event, and Player C chose to redeem his fifty collectors in the bonus game. The controller determines that the total number of collectors participating in the bonus event is sixty. Gaming devices 10*a* and 10*c* display the total number of collectors represented collectively by the group of symbols 230. In this embodiment, the collectors are represented by circles. Gaming devices 10*a* and 10*c* display a message indicating that the dark circles represent the collectors associated with Player A, and the light circles represent the collectors associated with Player C. In one embodiment, the bonus event includes a predetermined number of awards. In this embodiment, the awards in the bonus event are represented by flower symbols and have values of ten, fifty, one hundred, fifty thousand, and one-hundred-thousand credits. Awards of each value are represented by symbols 220, 222, 224, 226, and 228, respectively. In the bonus event, each collector in group 230 will attempt to earn or collect the awards, some of which are represented by symbols 220, 222, 224, 226, and 228. In one embodiment, each award may only be collected by one collector; once an award is collected by a collector, no other collectors in the bonus event may collect or be associated with that award. The controller determines any awards collected by or associated with each collector in group 230 and communicates those awards to gaming devices 10*a* and 10*c*.

It should be appreciated that the quantity and value of awards in the bonus game may be determined in any suitable manner or method. In different embodiments, the values of the awards in the bonus event are predetermined, randomly generated, determined based on the types of second triggering events, determined based on a player tracking system for the participating player(s), dependent on the amount of accumulated collectors redeemed in the bonus event, or determined based on any other suitable method or criteria. In one embodiment, the quantity of awards is greater than the total quantity of accumulated collectors redeemed in the bonus event. In another embodiment, the quantity of awards is equal to the total quantity of accumulated collectors redeemed or participating in the bonus event.

In another embodiment, the quantity of awards in the bonus event is less than the total quantity of accumulated collectors participating in the bonus event. In one such embodiment, the controller assigns or associates the available awards with collectors of each participating player or gaming device based on the percentage of total collectors participating in the bonus event that are associated with the participating player or gaming device. The controller assigns the available awards first to collectors associated with the player or gaming device that has contributed the greatest percentage of total participating collectors. The collectors associated with the player or gaming device that has contributed the lowest percentage of total participating collectors will be the last to be assigned an award. In another such embodiment, the controller assigns or associates awards with collectors of each participating player based on the player's rank in a player tracking system. For example, the controller assigns the available awards first to collectors associated with the highest-ranked player. The collectors associated with the lowest-ranked player will be the last to be assigned an award. In a further embodiment, once the controller has determined which gaming devices will participate in the bonus event, the gaming device at which the second triggering event occurred will provide the player the option to cancel the bonus event. For example, the player may want to cancel the bonus event if too many other players will be participating.

As illustrated in FIG. 4I, the controller determines awards associated with the dark and light collectors of Players A and C, respectively. Gaming devices 10*a* and 10*c* display the collectors adjacent to their determined awards. In one embodiment, the controller randomly determines that five of Player A's ten collectors and thirty of Player C's fifty collectors have earned awards of ten credits each. The controller randomly determines that one of Player A's ten collectors and six of Player C's fifty collectors have earned awards of fifty credits each. The controller randomly determines that four of Player A's ten collectors and fourteen of Player C's fifty collectors have earned awards of one hundred credits each. The controller sums the awards associated with the collectors of each player and determines total bonus awards of five hundred credits for Player A and two thousand credits for Player C.

In one embodiment, the probability of any collector earning or collecting a higher-valued award, such as the awards represented by symbols 226 and 228, increases with the total number of collectors participating in the bonus event. In one such embodiment, the lower-valued awards, such as those represented by symbols 220, 222, and 224, must be collected or earned before any higher-valued awards may be earned. In this embodiment, the lower-valued awards are closer to the collectors at the start of the bonus event. If there are too few collectors, all collectors will earn or collect lower-valued awards. However, if a high number of collectors are participating in the bonus event, certain of those collectors will earn higher-valued awards once the other collectors have earned or collected the lower-valued awards. In one such embodiment, a first player in the bonus event benefits if the collectors associated with other players collect or earn the lower-valued awards before the collectors associated with the first player have collected or earned any awards. This leaves the higher-valued awards in the bonus event to be collected or earned by the collectors associated with the first player.

It should be appreciated that the bonus event may be any suitable event in which a participating gaming device may earn or collect awards. In one embodiment, the bonus event includes a common pool of awards and the total award for each participating gaming device is based on the percentage of total collectors participating in the bonus event that are associated with the participating gaming device. In one such embodiment, the bonus event includes a common pool of awards. The total quantity of collectors participating in the bonus event act together to collect or earn a common pool of awards. A greater total quantity of collectors participating in the bonus event collects or earns a higher-valued common pool of awards. The common pool of awards is divided among the participating gaming devices based on each gaming device's respective contribution to the total quantity of collectors in the bonus event. In one example, the collectors of Players A and C act jointly in the bonus event to earn a common pool of awards worth five thousand credits. In this example, Player A chooses to redeem ten collectors in the bonus event, and Player C chooses to redeem forty collectors in the bonus event. Player A's ten collectors are twenty percent of the fifty total collectors in the bonus event, so the total bonus award for gaming device 10*a* is twenty percent of the value of the common pool of awards, one thousand credits. Player C's forty collectors are eighty percent of the fifty total collectors in the bonus event, so the total bonus award for gaming device 10*c* is eighty percent of the value of the common pool of awards, four thousand credits.

In another embodiment, the bonus event includes a predetermined quantity of awards and the total award for each participating gaming device is based on the awards earned by the total quantity of collectors participating in the bonus event. In one such embodiment, each collector participating in the bonus event may earn or be associated with one of the predetermined quantity of awards. The award for each collector is credited to all participating gaming devices, not just the gaming device associated with the collector.

It should be appreciated the bonus event may be displayed to the participating player(s) in any suitable manner. In one embodiment, a central or group display device displays the bonus event. In another embodiment, each participating gaming device displays the bonus event. In one embodiment, only one participating gaming device displays the bonus event. In a further embodiment, only the gaming device at which the second triggering event occurred displays the bonus event. In one embodiment, the awards in the bonus event are not visible to the participating player(s). For example, in one such embodiment, the bonus event includes a piñata with a common pool of prizes or awards. The piñata is visible to the participating player(s) but the prizes or awards within the piñata are not visible. In another embodiment, the awards in the bonus event, but not the values of those awards, are visible to the participating player(s).

It should be appreciated that the total number of collectors participating in the bonus event may be determined in any suitable manner. In one embodiment, the total number of collectors participating in the bonus event is the quantity of collectors to be redeemed by the gaming device at which the second triggering event occurred plus the total number of accumulated collectors from each of the other participating gaming devices. In another embodiment, the players of the other participating gaming devices may input the number of accumulated collectors to be redeemed in the bonus event. In one such embodiment, the sum of the number of accumulated collectors input by each other participating gaming device to be redeemed in the secondary game is the second quantity of collectors to be redeemed in the bonus event. The total number of collectors participating in the bonus event is the quantity of collectors to be redeemed by the gaming device at which the second triggering event occurred plus the second quantity of collectors to be redeemed in the bonus event.

It should be appreciated that the awards in the bonus event may be represented in any suitable manner. In one embodiment, the awards in the bonus event are represented by prizes in a displayed piñata. In one such embodiment, the collectors in the bonus event attempt to break open the piñata and collect a common pool of prizes or awards within the piñata. In a further embodiment, the awards within the piñata are distributed among the participating gaming devices based on the percentage of total collectors participating in the bonus event that are associated with the participating gaming device. In another embodiment, the awards in the bonus event are represented by a single video-game style enemy. In one such embodiment, the collectors in the bonus event act are represented by soldiers in an army. The collectors in the army act together to attempt to defeat the enemy and collect awards for defeating the enemy. In one further embodiment, the awards collected for defeating the enemy are distributed among the participating gaming devices based on the percentage of total collectors participating in the bonus event that are associated with the participating gaming device. In another further embodiment, the awards collected for defeating the enemy are distributed among the participating gaming devices based on the amount wagered in the primary game by the player of the participating gaming device. It should be appreciated that the awards collected for defeating the enemy may be distributed among the participating gaming devices in any suitable manner or method.

It should be appreciated that the collectors in the bonus event or during play of the primary game may be represented in any suitable manner. In one embodiment, each player of the gaming devices in the gaming system may choose a symbol to represent the collectors associated with that player or gaming device. In one embodiment, the collectors in the primary game are represented by a number displayed in a collector indicator and the collectors in the bonus event are represented by other suitable symbols or indicia. In another embodiment, the collectors in the primary game and in the bonus event are represented by the same symbols or indicia. In different embodiments, the collectors are represented by one or more of bee symbols, club symbols, robot symbols, shovel symbols, bullet symbols, animal symbols (such as kangaroos), soldier symbols.

It should be appreciated that any suitable manner of determining any awards associated with the collectors in the bonus event may be employed. In one embodiment, the award associated with each collector is randomly determined by the controller or the gaming device associated with that collector. In one such embodiment, the controller randomly associates each collector in the bonus event with an award from the predetermined quantity of awards. In another such embodiment, each gaming device randomly assigns each collector associated with that gaming device to an award from the predetermined quantity of awards. In a further embodiment, the controller or gaming device randomly assigns the lower-valued awards to the collectors before randomly assigning any higher-valued awards to any collectors. In another embodiment, the controller alternates assignment of awards of each value between the collectors of each participating gaming device until only collectors associated with one participating gaming device remain unassigned. In one such embodiment, the remaining unassigned collectors are each randomly assigned to an available award. In a further embodiment, the controller alternates assignment of lower-valued awards between the collectors of each participating gaming device before alternating the assignment of any higher-valued awards. In one embodiment, the controller assigns a certain percentage of collectors of each participating gaming device to awards of each value. The percentage of collectors assigned to awards of each value is based on the total number of collectors participating in the bonus event. In one such embodiment, the controller assigns a higher percentage of collectors of each participating gaming device to higher-valued awards when a higher total number of collectors participate in the bonus event. In one embodiment, the controller multiplies the awards associated with a participating player's collectors by a certain number. In one such embodiment, the number by which the awards are multiplied is based on the amount wagered by the participating player in the primary game. For example, the awards associated with a first participating player's collectors in the bonus event will be multiplied by a higher number than the awards associated with a second participating player's collectors if the first player that has wagered more than the second player in the primary game.

Figure 4J:
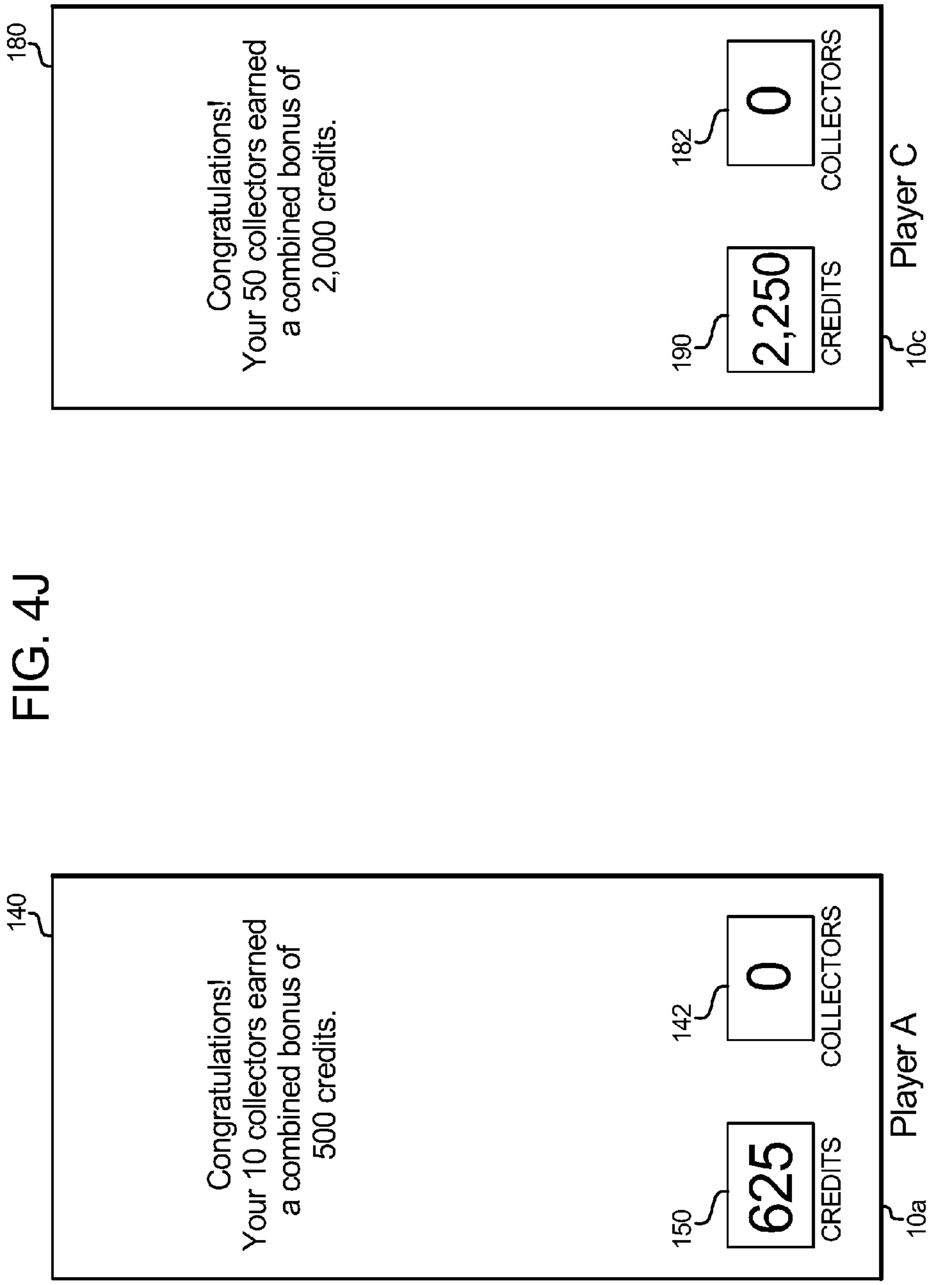

As illustrated in FIG. 4J, in one embodiment, controller has determined total awards in the bonus event for Players A and C of five hundred and two thousand credits, respectively. Display device 140 generates a message indicating that Player A's ten collectors have earned a total award in the bonus event of five hundred credits. Display device 180 generates a message indicating that Player C's fifty collectors have earned a total award in the bonus event of two thousand credits. The total credits for Players A and C are displayed in award indicators 150 and 190, respectively. The total collectors for Players A and C after the bonus event are zero as displayed in collector indicators 142 and 182, respectively.

It should be appreciated that any suitable manner of determining a total award in the bonus event for participating gaming devices may be utilized. In one embodiment, the total award for each participating gaming device is the sum of the awards collected by or associated with the collectors of said gaming device. In another embodiment, the total award for each participating gaming device is the highest-valued award collected by or associated with a collector of said gaming device. In an alternative embodiment, the total award for each participating gaming device is the lowest-valued award collected by or associated with a collector of said gaming device. In one embodiment, the total award for each participating gaming device is the sum of awards collected by or associated with a predetermined number of collectors of the gaming device.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

a plurality of gaming devices, each gaming device including:

at least one input device;

at least one display device;

at least one processor; and at least one memory device which stores a plurality of instructions, which when executed by the at least one processor, causes the at least one processor to operate with the at least one input device and the at least one display device to enable a player to place at least one wager on at least one play of at least one primary game;

at least one controller configured to communicate with each of the gaming devices, said at least one controller programmed to:

(a) upon each occurrence of a first triggering event, accumulate at least one collector for at least one of the players; and (b) upon an occurrence of a second triggering event:

(i) enable a first one of the players to redeem a quantity of collectors accumulated for said first one of the players, (ii) enable the first one of the players to invite at least a second one of the players to redeem any collectors accumulated for said second one of the players in a bonus event, wherein if the second one of the players redeems any collectors, the first one of the players has a higher bonus event average expected award than if the first one of the players were redeeming collectors alone, and (iii) thereafter, if the first one of the players redeems any of the quantity of collectors accumulated for said first one of the players:

(A) randomly associate at least one bonus event award with at least one redeemed collector accumulated for said first one of the players, (B) display the bonus event awards randomly associated with the redeemed collectors, and (C) provide the first one of the players any bonus event awards randomly associated with the redeemed collectors.

2. The gaming system of claim 1, wherein said first and second triggering events are independent of any primary game played at any of the gaming devices.

3. The gaming system of claim 1, wherein said second triggering event occurs when a predetermined number of collectors have accumulated for at least one of the plurality of gaming devices.

4. The gaming system of claim 1, wherein said first triggering event is the same as said second triggering event.

5. The gaming system of claim 1, wherein said at least one controller is programmed to enable each player redeeming collectors to choose the quantity of collectors accumulated for said player to redeem in the bonus event.

6. The gaming system of claim 1, wherein said at least one controller is programmed to enable the first player to cancel the bonus event once the other players have accepted or rejected the invitation to redeem collectors.

7. The gaming system of claim 1, wherein at least one of any wagers and any bonus event awards include at least one selected from the group consisting of: a quantity of monetary credits, a quantity of non-monetary credits, a quantity of promotional credits, and a quantity of player tracking points.

8. The gaming system of claim 1, wherein each gaming device includes a housing, and a plurality of input devices supported by the housing, said plurality of input devices including (i) an acceptor, (ii) a validator, and (iii) a cashout device, and when executed by the at least one processor, the plurality of instructions cause the at least one processor to operate with the plurality of input devices to: if a physical item is received via the acceptor: (i) identify, via the validator, the received physical item, and (ii) establish a credit balance based, at least in part, on a monetary value associated with the received and identified physical item, and if a cashout input is received via the cashout device, cause an initiation of any payout associated with the credit balance.

9. A gaming system comprising:
a plurality of gaming devices, each gaming device including:
at least one input device;
at least one display device;
at least one processor; and
at least one memory device which stores a plurality of instructions, which when executed by the at least one processor, causes the at least one processor to operate with the at least one input device and the at least one display device to enable a player to place at least one wager on at least one play of at least one primary game;
at least one controller configured to communicate with each of the gaming devices, said at least one controller programmed to:
(a) upon each occurrence of a first triggering event, accumulate at least one collector for the player; and
(b) upon an occurrence of a second triggering event:
(i) enable the player to redeem a quantity of collectors accumulated for said player,
(ii) enable the player to invite at least one virtual player to redeem any collectors accumulated for said virtual player in a bonus event, wherein if the virtual player redeems any collectors, the player has a higher bonus event average expected award than if the player were redeeming collectors alone, and
(iii) thereafter, if the player redeems any of the quantity of collectors accumulated for said player:
(A) randomly associate at least one bonus event award with at least one redeemed collector accumulated for said player,
(B) display the bonus event awards randomly associated with the redeemed collectors, and
(C) provide the player any bonus event awards randomly associated with the redeemed collectors.

10. The gaming system of claim 9, wherein the virtual player redeems virtual collectors.

11. The gaming system of claim 9, wherein at least one of any wagers and any bonus event awards include at least one selected from the group consisting of: a quantity of monetary credits, a quantity of non-monetary credits, a quantity of promotional credits, and a quantity of player tracking points.

12. The gaming system of claim 9, wherein each gaming device includes a housing, and a plurality of input devices supported by the housing, said plurality of input devices including (i) an acceptor, (ii) a validator, and (iii) a cashout device, and when executed by the at least one processor, the plurality of instructions cause the at least one processor to operate with the plurality of input devices to: if a physical item is received via the acceptor: (i) identify, via the validator, the received physical item, and (ii) establish a credit balance based, at least in part, on a monetary value associated with the received and identified physical item, and if a cashout input is received via the cashout device, cause an initiation of any payout associated with the credit balance.

13. A gaming system comprising:
a plurality of gaming devices, each gaming device including:
at least one input device;
at least one display device;
at least one processor; and
at least one memory device which stores a plurality of instructions, which when executed by the at least one processor, causes the at least one processor to operate with the at least one input device and the at least one display device to enable a player to place at least one wager on at least one play of at least one primary game;

at least one controller configured to communicate with each of the gaming devices, said at least one controller programmed to:
(a) upon an occurrence of a triggering event:
(i) trigger a play of a secondary game,
(ii) enable a first one of the players to invite at least a second one of the players to participate in the triggered play of the secondary game,
(iii) if the second one of the players rejects the invitation to participate in the triggered play of the secondary game, display the triggered play of the secondary game to the first one of the players, and
(iv) if the second one of the players accepts the invitation to participate in the triggered play of the secondary game, display the triggered play of the secondary game to the first one of the players and the second one of the players, wherein if the second one of the players accepts the invitation to participate in the triggered play of the secondary game, the triggered play of the secondary game has a higher average expected award for each of the players participating in the triggered play of the secondary game than if the first one of the players were participating in the triggered play of the secondary game alone.

14. The gaming system of claim 13, wherein said triggering event is independent of any primary game played at any of the gaming devices.

15. The gaming system of claim 13, wherein said at least one controller is programmed to enable the first one of the players to cancel the triggered play of the secondary game once the second one of the players has accepted or rejects the invitation to participate in the triggered play of the secondary game.

16. The gaming system of claim 13, wherein any wagers include at least one selected from the group consisting of: a quantity of monetary credits, a quantity of non-monetary credits, a quantity of promotional credits, and a quantity of player tracking points.

17. The gaming system of claim 13, wherein each gaming device includes a housing, and a plurality of input devices supported by the housing, said plurality of input devices including (i) an acceptor, (ii) a validator, and (iii) a cashout device, and when executed by the at least one processor, the plurality of instructions cause the at least one processor to operate with the plurality of input devices to: if a physical item is received via the acceptor: (i) identify, via the validator, the received physical item, and (ii) establish a credit balance based, at least in part, on a monetary value associated with the received and identified physical item, and if a cashout input is received via the cashout device, cause an initiation of any payout associated with the credit balance.

18. A gaming system server comprising:
at least one processor; and
at least one memory device which stores a plurality of instructions, which when executed by the at least one processor, causes the at least one processor to:
(a) for each of a plurality of players, receive data representing a wager placed in association with a play of a primary game, and
(b) upon an occurrence of a triggering event:
(i) trigger a play of a secondary game,
(ii) receive data representing at least one input by the first one of the players to invite at least a second one of the players to participate in the triggered play of the secondary game, (iii) if the second one of the players rejects the invitation to participate in the triggered play of the secondary game, cause at least one display device to display the triggered play of the secondary game to the first one of the players, and (iv) if the second one of the players accepts the invitation to participate in the triggered play of the secondary game, cause the at least one display device to display the triggered play of the secondary game to the first one of the players and the second one of the players, wherein if the second one of the players accepts the invitation to participate in the triggered play of the secondary game, the triggered play of the secondary game has a higher average expected award for each of the players participating in the triggered play of the secondary game than if the first one of the players were participating in the triggered play of the secondary game alone.

19. The gaming system server of claim 18, wherein said triggering event is independent of any primary game played at any of the gaming devices.

20. The gaming system server of claim 18, wherein when executed by the at least one processor, the plurality of instructions cause the at least one processor to receive data representing at least one input by the first one of the players to cancel the triggered play of the secondary game once the second one of the players has accepted or rejected the invitation to participate in the triggered play of the secondary game.

21. The gaming system server of claim 18, wherein any wagers include at least one selected from the group consisting of: a quantity of monetary credits, a quantity of non-monetary credits, a quantity of promotional credits, and a quantity of player tracking points.

22. The gaming system server of claim 18, which transmits and receives data over a data network.

23. The gaming system server of claim 22, wherein the data network is an Internet.

24. The gaming system server of claim 18, wherein the placed wager causes a reduction of a credit balance which is increasable via: (i) an acceptor of a physical item associated with a monetary value, and (ii) a validator configured to identify the physical item, and decreasable via a cashout device configured to receive an input to cause an initiation of a payout associated with the credit balance.

25. A gaming system comprising:

a plurality of gaming devices, each gaming device including:

at least one input device;

at least one display device;

at least one processor; and at least one memory device which stores a plurality of instructions, which when executed by the at least one processor, causes the at least one processor to operate with the at least one input device and the at least one display device to enable a player to place at least one wager on at least one play of at least one primary game;

at least one controller configured to communicate with each of the gaming devices, said at least one controller programmed to:

(a) upon an occurrence of a triggering event:

(i) trigger a play of a secondary game, (ii) enable a first one of the players to invite at least a second one of the players to participate in the triggered play of the secondary game, (iii) enable the first one of the players to cancel the triggered play of the secondary game once the second one of the players has accepted or rejected the invitation to participate in the triggered play of the secondary game, (iv) if the second one of the players rejects the invitation to participate in the triggered play of the secondary game and the first one of the players has not cancelled the triggered play of the secondary game, display the triggered play of the secondary game to the first one of the players, and (v) if the second one of the players accepts the invitation to participate in the triggered play of the secondary game and the first one of the players has not cancelled the triggered play of the secondary game, display the triggered play of the secondary game to the first one of the players and the second one of the players, wherein if the second one of the players accepts the invitation to participate in the triggered play of the secondary game, the triggered play of the secondary game has a higher average expected award than if the first one of the players were participating in the triggered play of the secondary game alone.

26. The gaming system of claim 25, wherein each gaming device includes a housing, and a plurality of input devices supported by the housing, said plurality of input devices including (i) an acceptor, (ii) a validator, and (iii) a cashout device, and when executed by the at least one processor, the plurality of instructions cause the at least one processor to operate with the plurality of input devices to: if a physical item is received via the acceptor: (i) identify, via the validator, the received physical item, and (ii) establish a credit balance based, at least in part, on a monetary value associated with the received and identified physical item, and if a cashout input is received via the cashout device, cause an initiation of any payout associated with the credit balance.

27. A gaming system server comprising:

at least one processor; and at least one memory device which stores a plurality of instructions, which when executed by the at least one processor, causes the at least one processor to:

(a) for each of a plurality of players, receive data representing a wager placed in association with a play of a primary game, and (b) upon an occurrence of a triggering event:

(i) trigger a play of a secondary game, (ii) receive data representing at least one input by the first one of the players to invite at least a second one of the players to participate in the triggered play of the secondary game, (iii) receive data representing at least one input by the first one of the players to cancel the triggered play of the secondary game once the second one of the players has accepted or rejected the invitation to participate in the triggered play of the secondary game, (iv) if the second one of the players rejects the invitation to participate in the triggered play of the secondary game and the first one of the players has not cancelled the triggered play of the secondary game, cause at least one display device to display the triggered play of the secondary game to the first one of the players, and (v) if the second one of the players accepts the invitation to participate in the triggered play of the secondary game and the first one of the players has not cancelled the triggered play of the secondary game, cause the at least one display device to display the triggered play of the secondary game to the first one of the players and the second one of the players, wherein if the second one of the players accepts the invitation to participate in the triggered play of the secondary game, the triggered play of the secondary game has a higher average expected award than if the first one of the players were participating in the triggered play of the secondary game alone.

28. The gaming system server of claim 27, wherein the placed wager causes a reduction of a credit balance which is increasable via: (i) an acceptor of a physical item associated with a monetary value, and (ii) a validator configured to identify the physical item, and decreasable via a cashout device configured to receive an input to cause an initiation of a payout associated with the credit balance.

* * * * *